(12) United States Patent
Kamiya et al.

(10) Patent No.: US 9,671,293 B2
(45) Date of Patent: Jun. 6, 2017

(54) TEMPERATURE DETECTION CIRCUIT AND TEMPERATURE MEASUREMENT CIRCUIT

(71) Applicant: Spansion LLC, Sunnyvale, CA (US)

(72) Inventors: Kazuhiro Kamiya, Kanagawa (JP); Kimitoshi Niratsuka, Kanagawa (JP)

(73) Assignee: Cypress Semiconductor Corporation, San Jose, CA (US)

( * ) Notice: Subject to any disclaimer, the term of this patent is extended or adjusted under 35 U.S.C. 154(b) by 115 days.

(21) Appl. No.: 14/551,149

(22) Filed: Nov. 24, 2014

(65) Prior Publication Data

US 2016/0146675 A1    May 26, 2016

(51) Int. Cl.
     *G01K 3/00*    (2006.01)
     *G01K 1/02*    (2006.01)

(52) U.S. Cl.
     CPC ............. *G01K 3/005* (2013.01); *G01K 1/026* (2013.01)

(58) Field of Classification Search
     CPC .......... G01K 7/00; G01K 3/005; G01K 1/026; H03K 3/03; H03K 3/0315; H03K 2005/00143; H03K 5/14; H03K 5/1504; H03L 7/0995; H03L 2207/06; H03L 2207/50; G11C 11/40626; H03M 1/502; H03M 1/207

USPC .............. 374/163, 1, 170–171; 702/130, 99; 377/25; 364/528.23; 331/57, 176
See application file for complete search history.

(56) References Cited

U.S. PATENT DOCUMENTS

| | | | | |
|---|---|---|---|---|
| 6,937,958 | B2 * | 8/2005 | Gold ....................... | G06F 1/206 257/E23.08 |
| 2005/0261866 | A1 * | 11/2005 | Boerstler ................. | G01K 7/01 702/130 |
| 2013/0076381 | A1 * | 3/2013 | Takayanagi ............ | G01K 3/005 324/750.03 |
| 2015/0244375 | A1 * | 8/2015 | Pelley .................... | H03K 21/38 377/25 |

FOREIGN PATENT DOCUMENTS

JP      2000-241252      9/2000

\* cited by examiner

*Primary Examiner* — Lisa Caputo
*Assistant Examiner* — Nathaniel T Woodward

(57) ABSTRACT

A temperature detection circuit and a temperature measurement circuit capable of detecting and measuring temperatures precisely are disclosed. The temperature detection circuit includes n temperature detectors (n is an integer of 2 or more), each of the temperature detectors being configured to output a detection signal of high level when a temperature of an object reaches a first value, and a temperature determination part configured to determine whether or not the temperature of the object has reached a second value based on a count of high-level detection signals.

10 Claims, 23 Drawing Sheets

FIG. 20

| COUNT | TEMPERATURE[°C] | |
|---|---|---|
| 3 | 135.0 | −3σ |
| 6 | 137.5 | −2.5σ |
| 23 | 140.0 | −2σ |
| 67 | 142.5 | −1.5σ |
| 159 | 145.0 | −1σ |
| 309 | 147.5 | −0.5σ |
| 382 | 148.5 | −0.3σ |
| 421 | 149.0 | −0.2σ |
| 460 | 149.5 | −0.1σ |
| 500 | 150.0 | 0 |
| 540 | 150.5 | +0.1σ |
| 579 | 151.0 | +0.2σ |
| 618 | 151.5 | +0.3σ |
| 691 | 152.5 | +0.5σ |
| 841 | 155.0 | +1σ |
| 933 | 157.5 | +1.5σ |
| 977 | 160.0 | +2σ |
| 994 | 162.5 | +2.5σ |
| 997 | 165.0 | +3σ |

TEMPERATURE DETECTION CIRCUIT AND TEMPERATURE MEASUREMENT CIRCUIT

BACKGROUND

An example of a temperature detection circuit is disclosed in Japanese Patent Application Publication No. 2000-241252. The temperature detection circuit supplies constant current to two strings of series-connected diodes. One string includes N+M diodes and the other string includes N diodes. The temperature detection circuit compares voltages across the two strings by a comparator to detect a predetermined temperature.

However, in this temperature detection circuit, the input of the comparator includes an offset voltage. Consequently, the temperature detected by the comparator includes the offset voltage as an error, and the degree of precision of the temperature detected may not be improved beyond the accuracy of the comparator.

SUMMARY

The present invention provides a temperature detection circuit and a temperature measurement circuit respectively capable of detecting and measuring temperatures precisely.

A temperature detection circuit, according to an example embodiment, comprises: a plurality of temperature detectors, each of the plurality of temperature detectors being configured to output a detection signal having a predetermined level when a temperature of an object reaches a first value; and a temperature determination part configured to determine whether or not the temperature of the object has reached a second value based on the number of detection signals.

A temperature measurement circuit, according to an example embodiment, comprises: a plurality of temperature detectors, each of the plurality of temperature detectors being configured to output a detection signal having a predetermined level when a temperature of an object reaches a predetermined value; and a temperature measurement part configured to measure a temperature of the object based on the number of detection signals.

BRIEF DESCRIPTION OF THE DRAWINGS

The accompanying drawings are incorporated herein and form a part of the specification.

FIG. 20 is a table showing a relationship between the total number of detection signals and the temperature of an object in the normal distribution in FIG. 19.

In the drawings, like reference numbers generally indicate identical or similar elements. Additionally, generally, the left-most digit(s) of a reference number identifies the drawing in which the reference number first appears.

DETAILED DESCRIPTION

Temperature Detection Circuit

Figure 1:
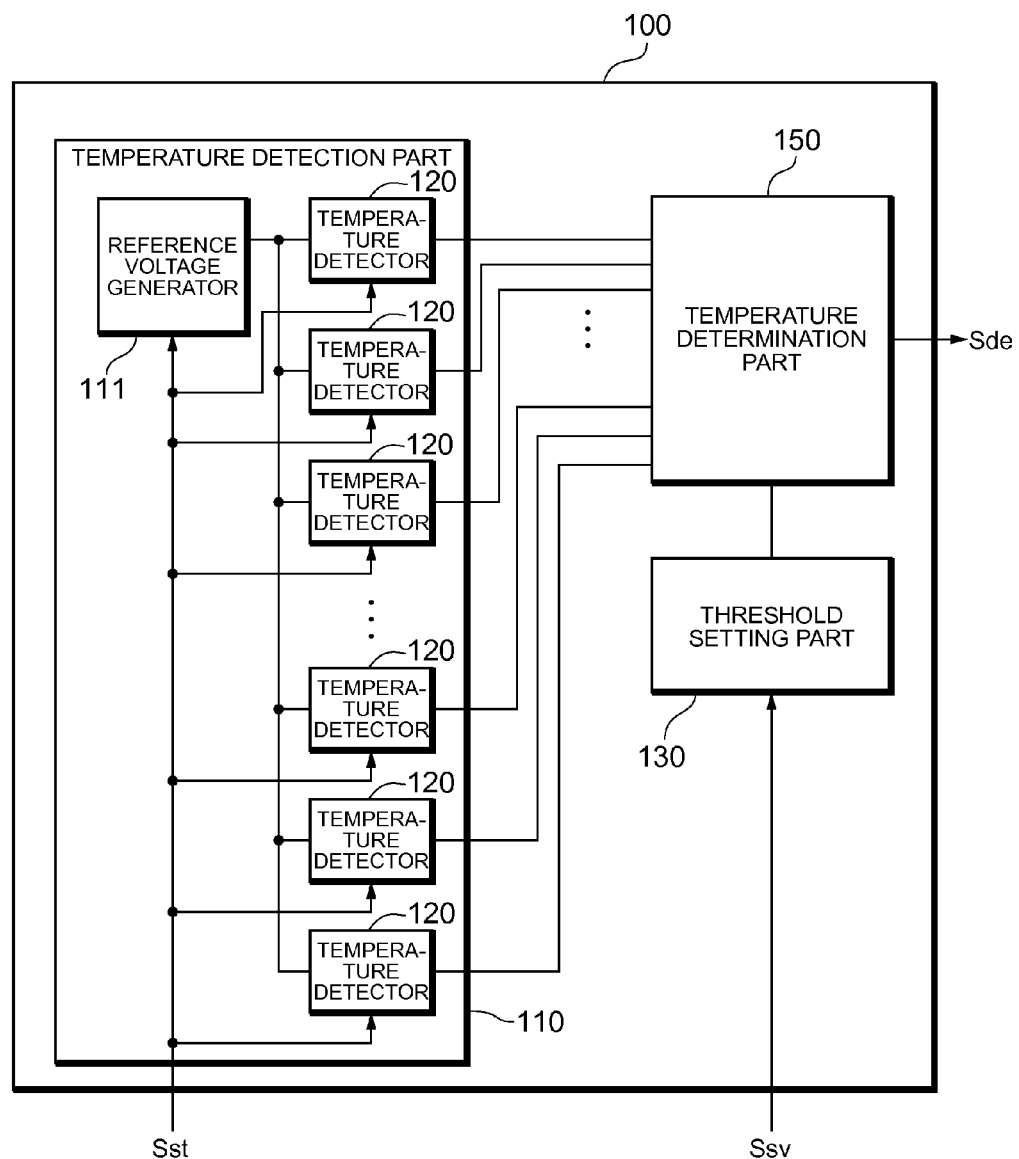
FIG. 1 is a block diagram illustrating a first example of a temperature detection circuit, according to an example embodiment.

FIGS. 1 to 20 describe an example embodiment of a temperature detection circuit. FIG. 1 is a block diagram illustrating a first example of a temperature detection circuit 100, according to an example embodiment. The temperature detection circuit 100 may be incorporated into an attemperator, for example, and may be configured to detect when an object reaches a predetermined temperature. The object, for example, may be a semiconductor device used as a protection target of the attemperator, or the air where the semiconductor device is located. As illustrated in FIG. 1, the temperature detection circuit 100 includes a temperature detection part 110, a threshold setting part 130 and a temperature determination part 150.

The temperature detection part 110 receives as an input a starting signal Sst from an external electronic circuit or electronic device, for example. The starting signal Sst is to start the temperature detection of the object. The temperature detection part 110 includes a reference voltage generator 111 and n (n is an integer of 2 or more) temperature detectors 120, for example. The starting signal Sst is input to the reference voltage generator 111 and each temperature detector 120. The reference voltage generator 111 and each temperature detector 120 are mutually connected.

The threshold setting part 130 receives as an input a setting value signal Ssv from an external electronic circuit or electronic device, for example. The setting value signal Ssv is to set the object's predetermined temperature value that is to be detected by the temperature detection circuit 100.

The temperature determination part 150 outputs a determination signal Sde to an external electronic circuit or electronic device, for example. The determination signal Sde is to report that the object is at the predetermined temperature.

Figure 2:
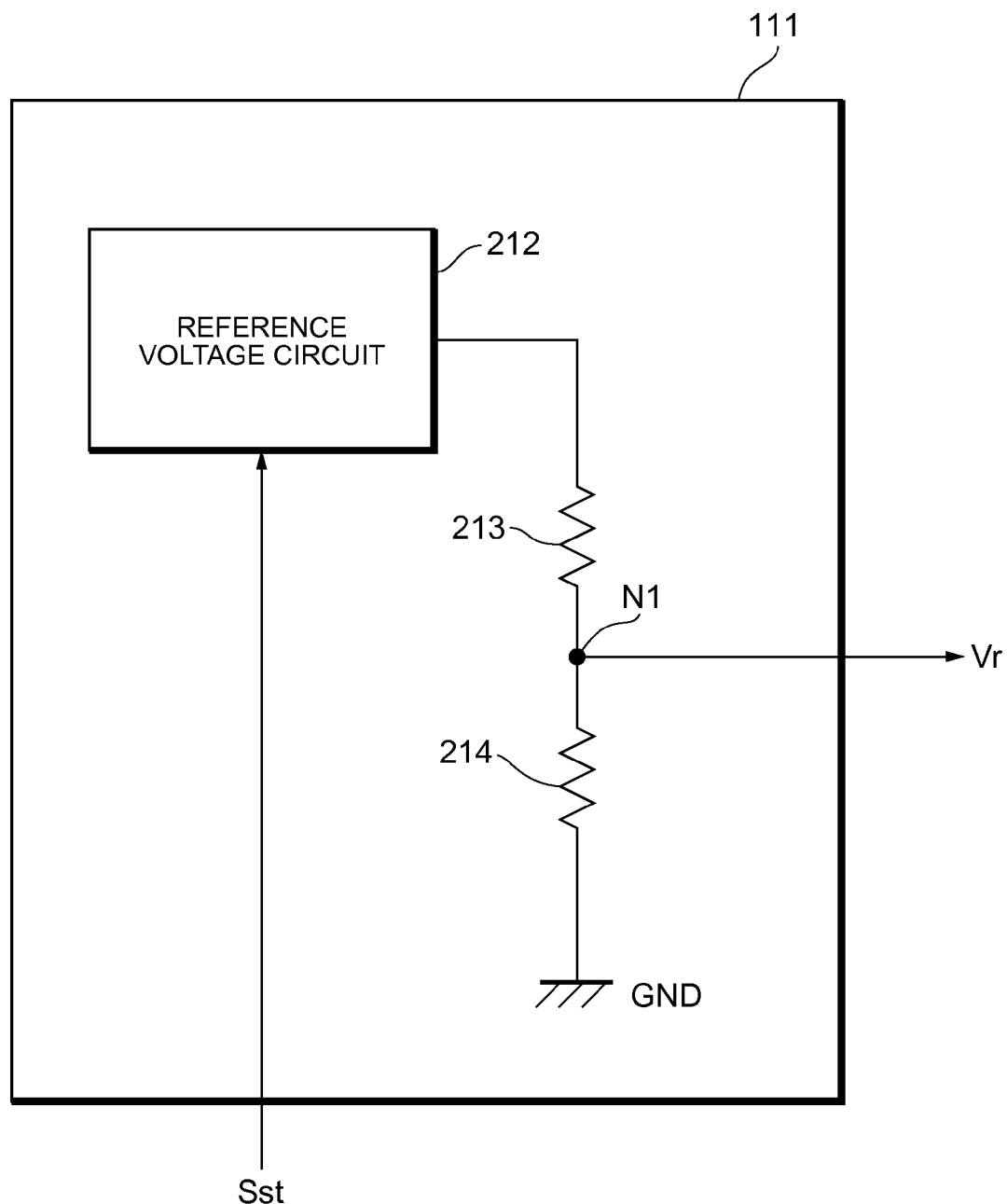
FIG. 2 is a circuit diagram illustrating a reference voltage generator, according to an example embodiment.

FIG. 2 is a circuit diagram illustrating an example of the reference voltage generator 111 in FIG. 1. The reference voltage generator 111 is configured to generate reference voltage Vr. As illustrated in FIG. 2, the reference voltage generator 111 includes a reference voltage circuit 212, a resistor 213 and a resistor 214, for example.

The reference voltage circuit 212 is configured to generate predetermined constant voltage in response to the starting signal Sst. The reference voltage circuit 212 may be a bandgap reference circuit, for example, and may generate voltage at 1.2 V, for example. The resistor 213 and the resistor 214 are disposed between the output of the reference voltage circuit 212 and ground GND. The resistor 213 and the resistor 214 divide voltage output from the reference voltage circuit 212 with a dividing ratio in accordance with their resistance values. The voltage subjected to voltage dividing by the resistor 213 and the resistor 214 is output as reference voltage Vr. The reference voltage generator 111 may generate reference voltage Vr at 0.4 V, for example, and supplies the reference voltage Vr to each of the n temperature detectors 120.

FIG. 1 shows the example where the temperature detection part 110 includes the reference voltage generator 111. However, this is not a limiting example. The reference voltage Vr may be supplied to each temperature detector 120 from an external electronic circuit or electronic device, for example. In such a case, the temperature detection circuit 100 does not have to include the reference voltage generator 111.

Figure 3:
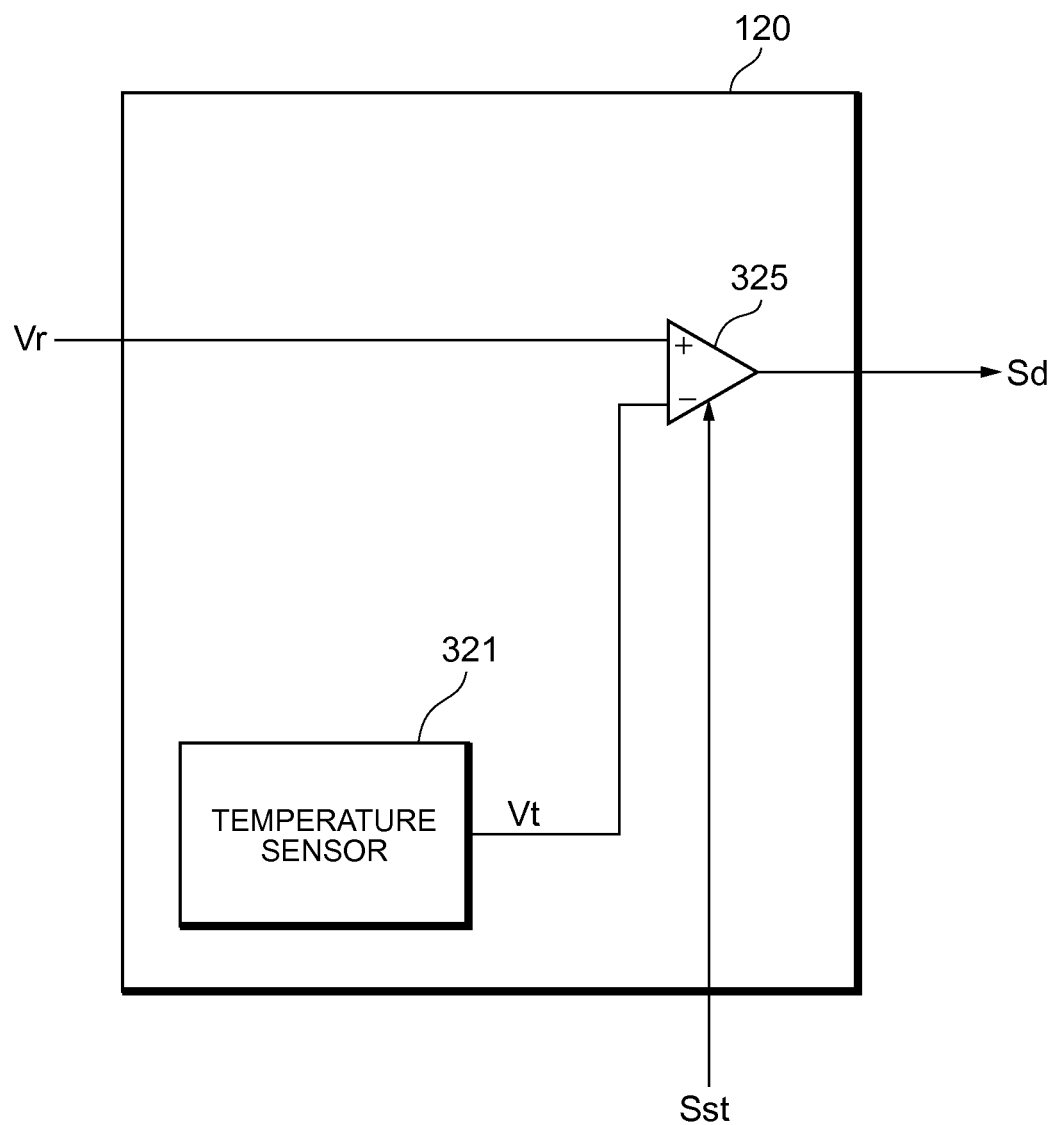
FIG. 3 is a circuit diagram illustrating a temperature detector, according to an example embodiment.

FIG. 3 is a circuit diagram illustrating an example of each temperature detector 120. Each temperature detector 120 is configured to output a detection signal Sd at a predetermined level when the temperature of the object equals a first value TA1. As illustrated in FIG. 3, each temperature detector 120 includes a temperature sensor 321 and a comparator 25, for example.

The temperature sensor 321 is configured to output a voltage Vt in accordance with the temperature of the object. The comparator 325 has a non-inverting input terminal, to which the reference voltage Vr from the reference voltage generator 111 in FIG. 2 is supplied, and an inverting input terminal, to which the voltage Vt from the temperature sensor 321 is supplied.

The comparator 325 compares the reference voltage Vr and the voltage Vt in response to the starting signal Sst, and outputs a detection signal Sd based on the comparison. The comparator 325 outputs a detection signal Sd at a relatively high voltage level (hereinafter called an "H level") when the reference voltage Vr is greater than or equal to the voltage Vt, for example. On the other hand, the comparator 325 outputs a detection signal Sd at a relatively low level (hereinafter called an "L level") when the reference voltage Vr is lower than the voltage Vt, for example.

FIGS. 1 and 3 show the example where each temperature detector 120 includes the temperature sensor 321. However, this is not a limiting example. The voltage Vt may be supplied to each temperature detector 120 from an external electronic circuit or electronic device, for example. In such a case, the temperature detector 120 does not have to include the temperature sensor 321. Further, at least two of the temperature detectors 120 may be configured to share the temperature sensor 321, for example.

Figure 4:
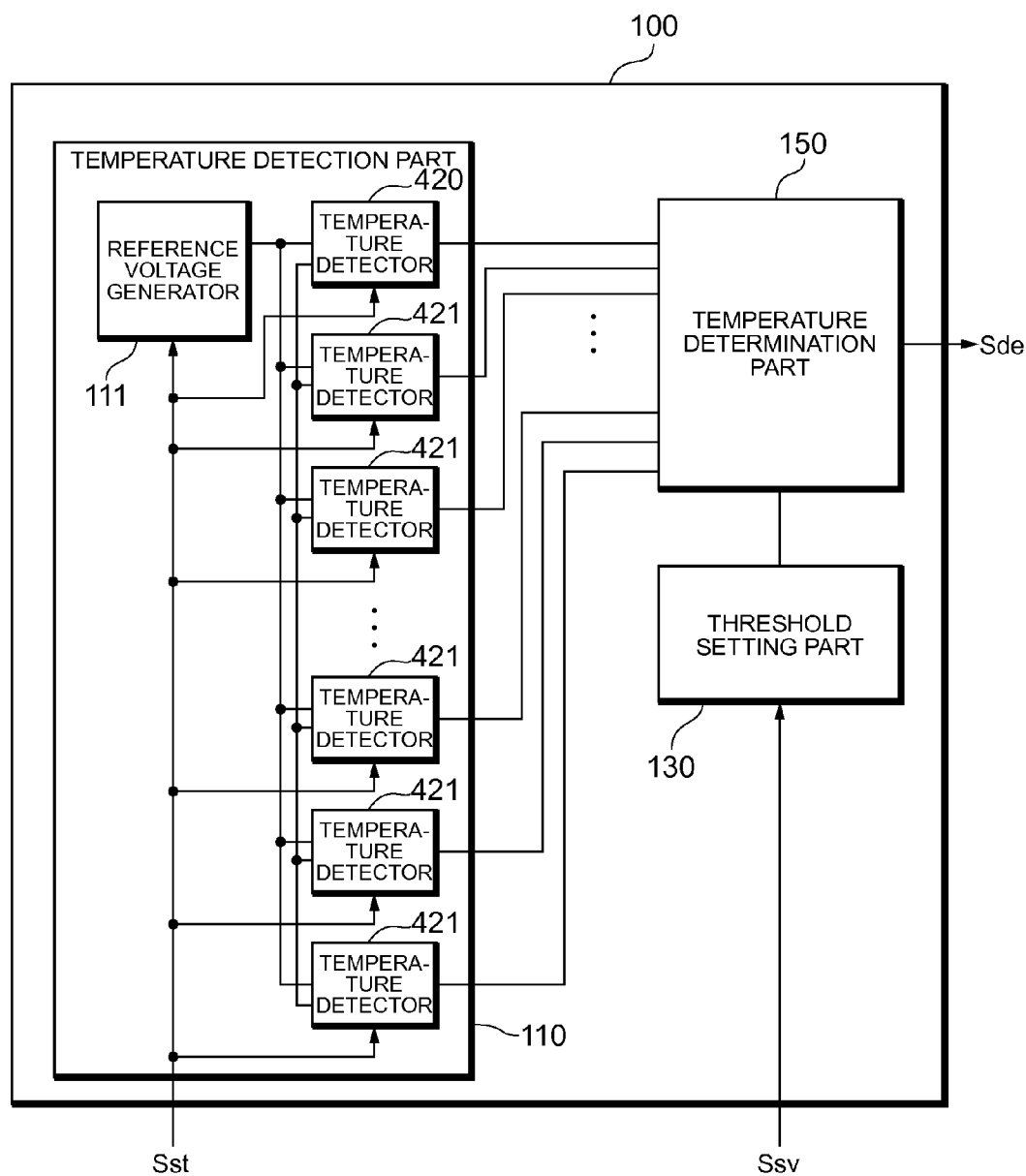
FIG. 4 is a block diagram illustrating a second example of the temperature detection circuit, according to an example embodiment.
Figure 5:
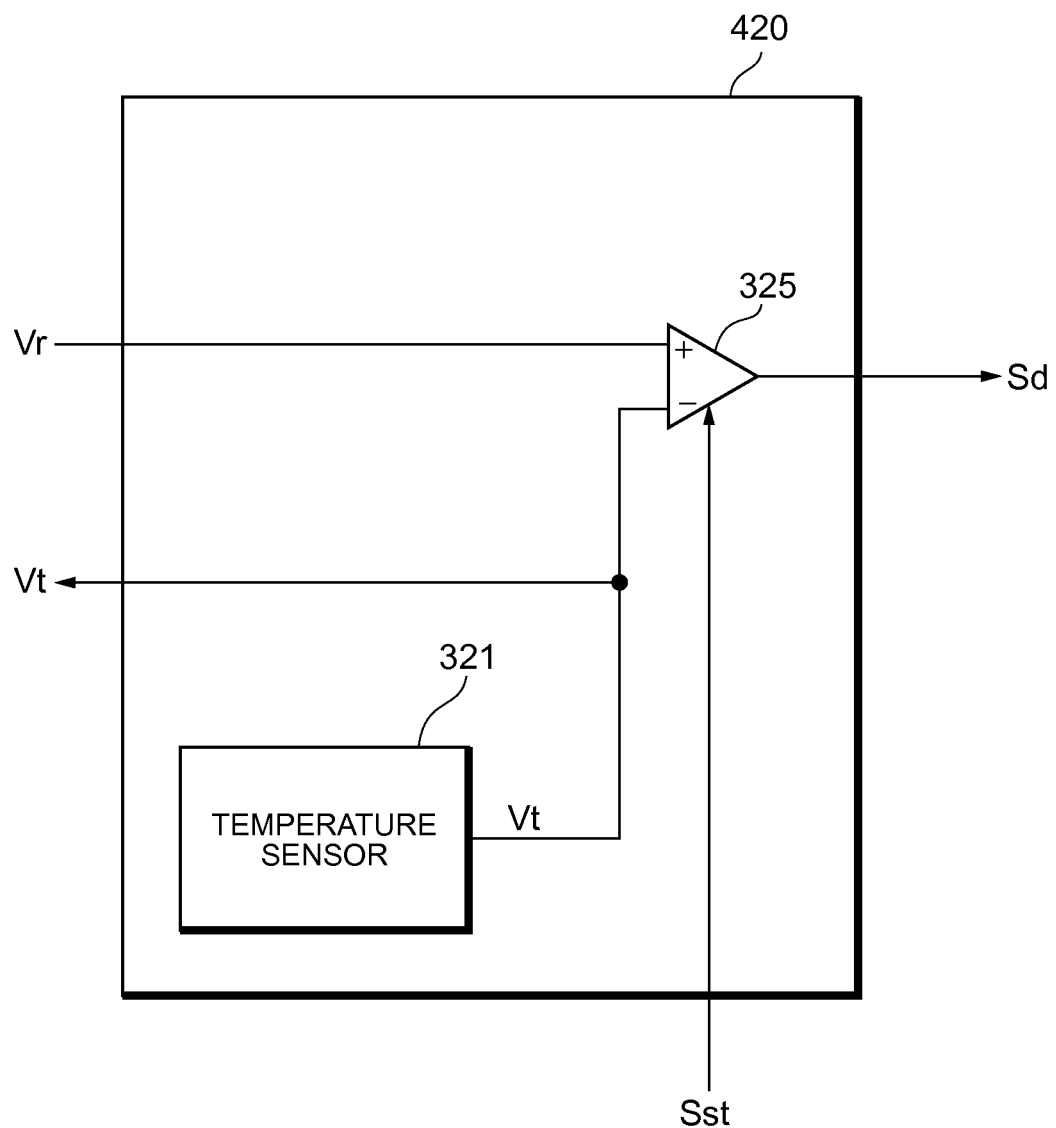
FIG. 5 is a circuit diagram illustrating an example of a temperature detector, according to an example embodiment.
Figure 6:
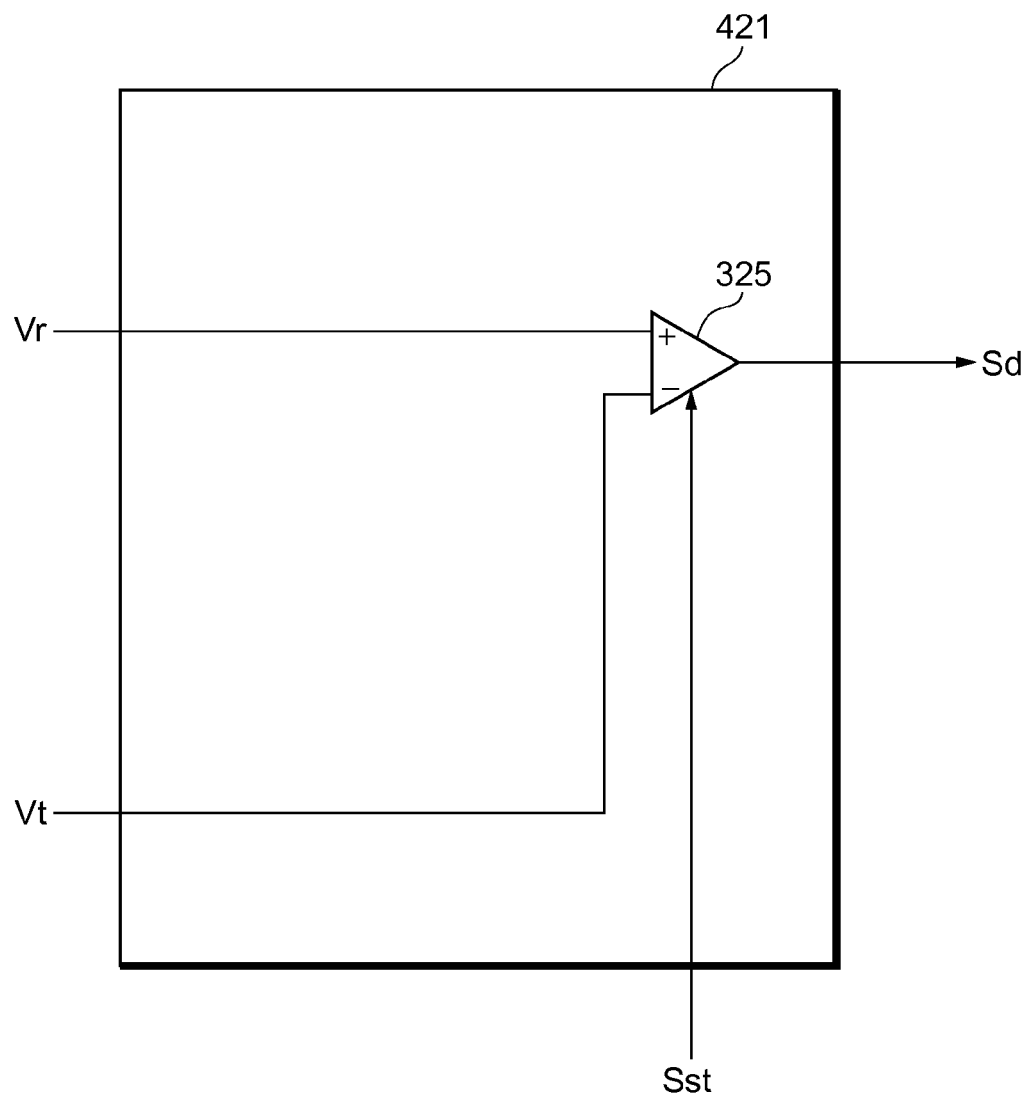
FIG. 6 is a circuit diagram illustrating an example of a temperature detector, according to an example embodiment.

FIG. 4 is a block diagram illustrating a second example of the temperature detection circuit 100, FIG. 5 is a circuit diagram illustrating an example of a temperature detector 420, and FIG. 6 is a circuit diagram illustrating an example of each temperature detector 421. As illustrated in FIG. 4, the temperature detection part 110 includes the reference voltage generator 111, a temperature detectors 420 and n−1 temperature detectors 421, for example. As is the case in each temperature detector 120, the temperature detector 420 and each temperature detector 421 are configured to output the detection signal Sd at the predetermined level when the temperature of the object equals the first value TA1. As illustrated in FIG. 5, the temperature detector 420 includes the temperature sensor 321 and the comparator 325, for example. On the other hand, as illustrated in FIG. 6, each temperature detector 421 includes the comparator 325, for example. The temperature sensor 321 supplies the voltage Vt to both the comparators 325 in FIGS. 5 and 6. The comparator 325 has a non-inverting input terminal, to which the reference voltage Vr from the reference voltage generator 111 in FIG. 2 is supplied, and an inverting input terminal, to which the voltage Vt from the temperature sensor 321 is supplied. As a result, the temperature sensor 321 is shared by the temperature detector 420 and Each temperature detector 421.

Figure 7:
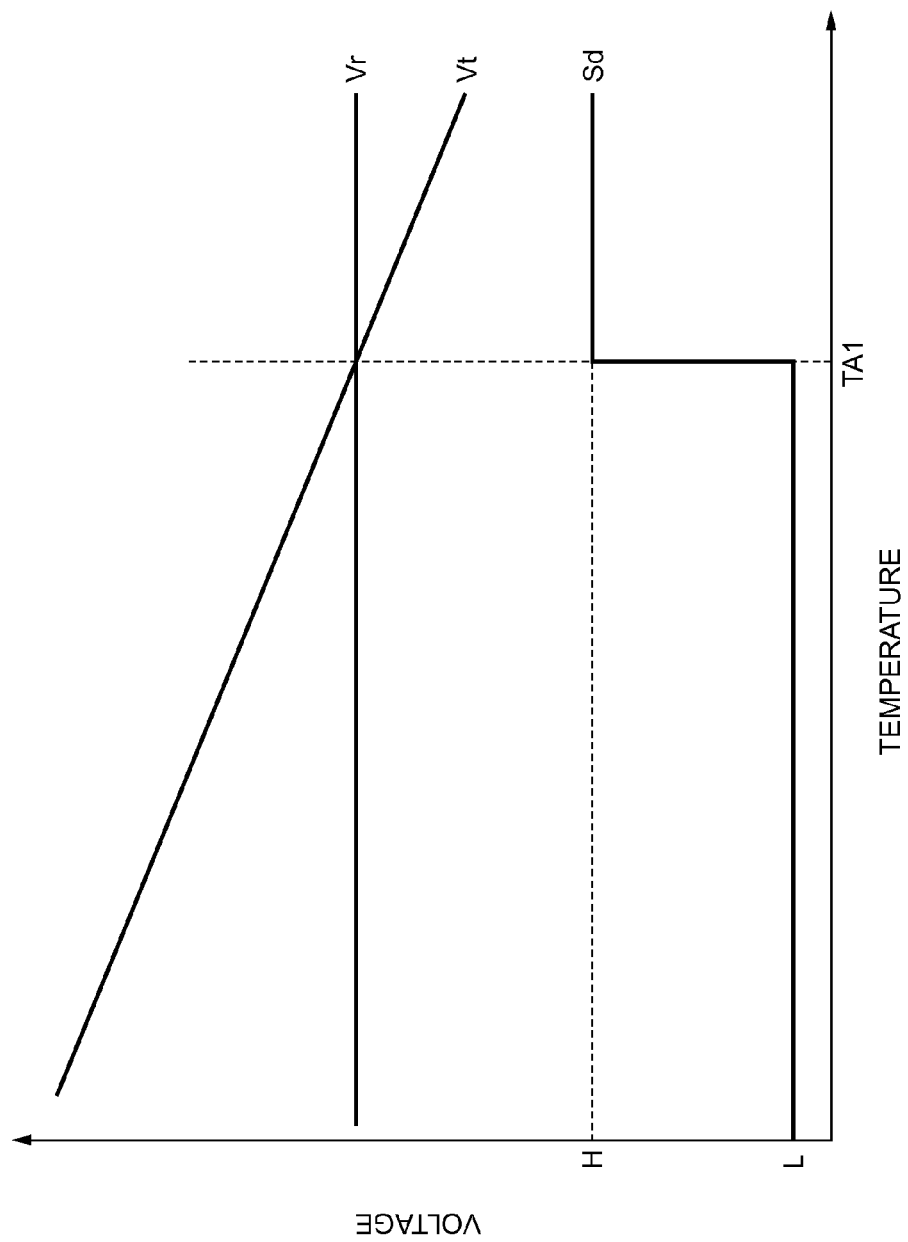
FIG. 7 is a graph describing an operation of a temperature detector, according to an example embodiment.

FIG. 7 is a graph describing an operation of the temperature detector 120. In FIG. 7, the horizontal axis represents temperature and the vertical axis represents voltage. As illustrated in FIG. 7, the voltage Vt of the temperature sensor 321 in FIG. 3 decreases in proportion to increasing temperature, for example. On the other hand, the reference voltage Vr generated by the reference voltage generator 111 in FIG. 2 is constant irrespective of the temperature. The value of the reference voltage Vr is set to be the same value as the value of the voltage Vt of the temperature sensor 321 when the temperature of the object reaches the first value TA1. That is, the detection signal Sd of the comparator 325 in FIG. 3 is at an L level when the temperature of the object is lower than the first value TA1, and changes to an H level when the temperature of the object reaches the first value TA1. As a result, the detection signal Sd at an H level is output when the temperature of the object reaches the first value TA1.

FIG. 7 shows the example where the temperature detector 120 outputs the detection signal Sd at an H level when the temperature of the object reaches the first value TA1. However, this is not a limiting example. The temperature detector 120 may be configured to output a detection signal Sd at an H level when the temperature of the object is lower than the first value TA1 and output a detection signal Sd at an L level when the temperature of the object reaches the first value TA1, for example.

Figure 8:
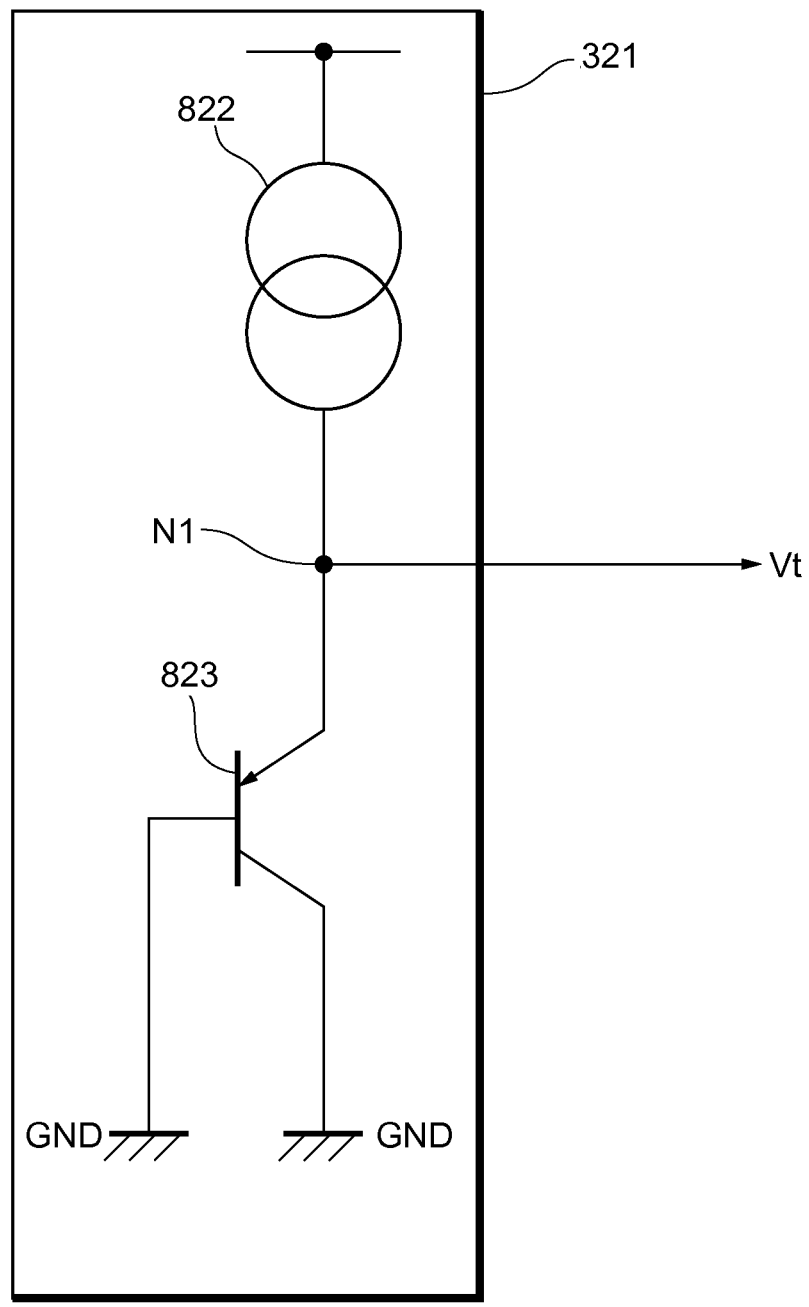
FIG. 8 is a circuit diagram illustrating a first example of the temperature sensor, according to an example embodiment.

FIG. 8 is a circuit diagram illustrating a first example of the temperature sensor 321. As illustrated in FIG. 8, the temperature sensor 321 includes a current source 822 and a transistor 823, for example. The transistor 823 is a pnp-type bipolar transistor, for example, whose base and collector are connected to the ground GND. The emitter of the transistor 823 is connected to the node N1, to which a constant current is supplied from the current source 822. The voltage at the node N1 is output as the voltage Vt. Since the voltage between the base and the emitter of the transistor 823 has a temperature characteristic, the voltage Vt changes in proportion to temperature.

FIG. 8 shows the example where the temperature sensor 321 includes the current source 822 and the transistor 823. However, this is not a limiting example. The temperature sensor 321 may have another configuration as long as it outputs voltage Vt in accordance with the temperature of the object within a predetermined range of temperature.

Figure 9:
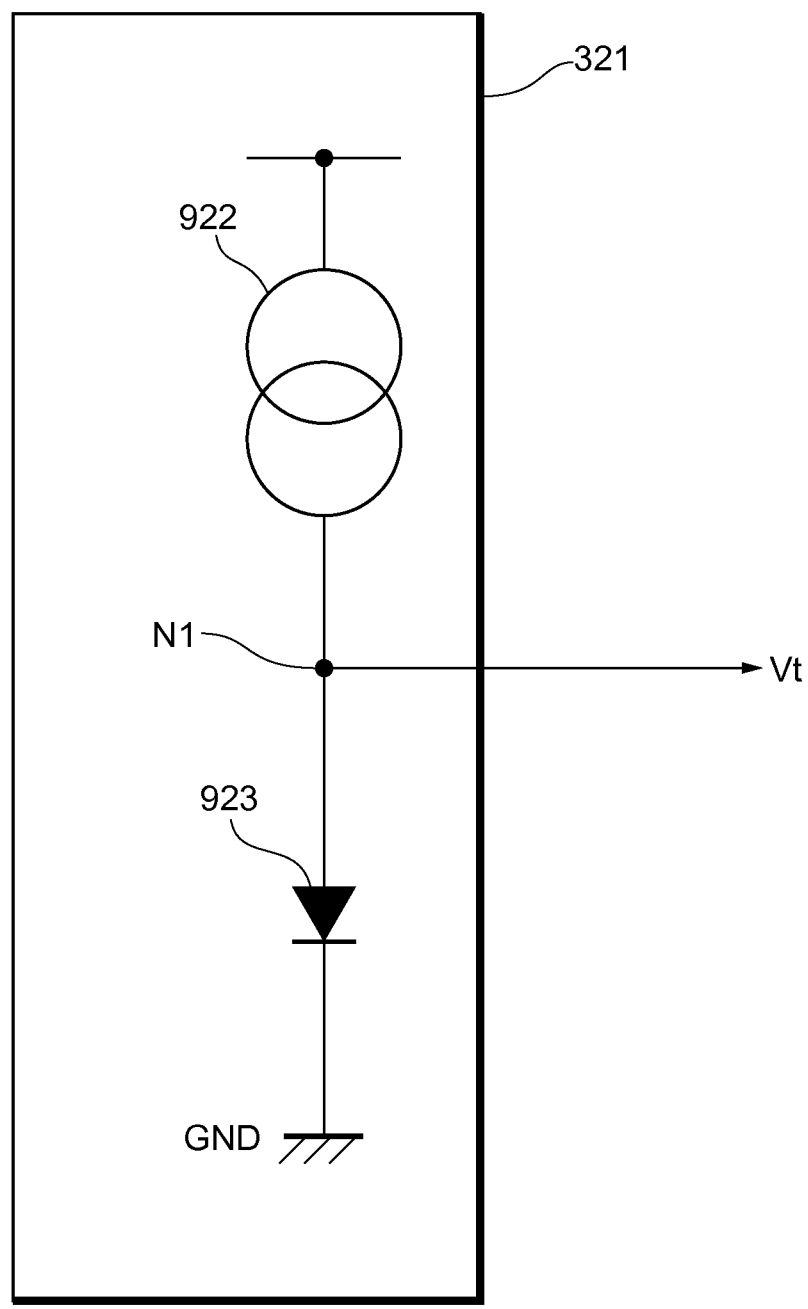
FIG. 9 is a circuit diagram illustrating a second example of the temperature sensor, according to an example embodiment.

FIG. 9 is a circuit diagram illustrating a second example of the temperature sensor 321. As illustrated in FIG. 9, the temperature sensor 321 includes a current source 922 and a diode 923, for example. The diode 923 has a cathode connected to the ground GND and an anode connected to the node N1, to which a constant current is supplied from the current source 922. The voltage at the node N1 is output as the voltage Vt. Since the voltage in the forward direction of the diode 923 has a temperature characteristic, the voltage Vt changes in proportion to temperature.

Figure 10:
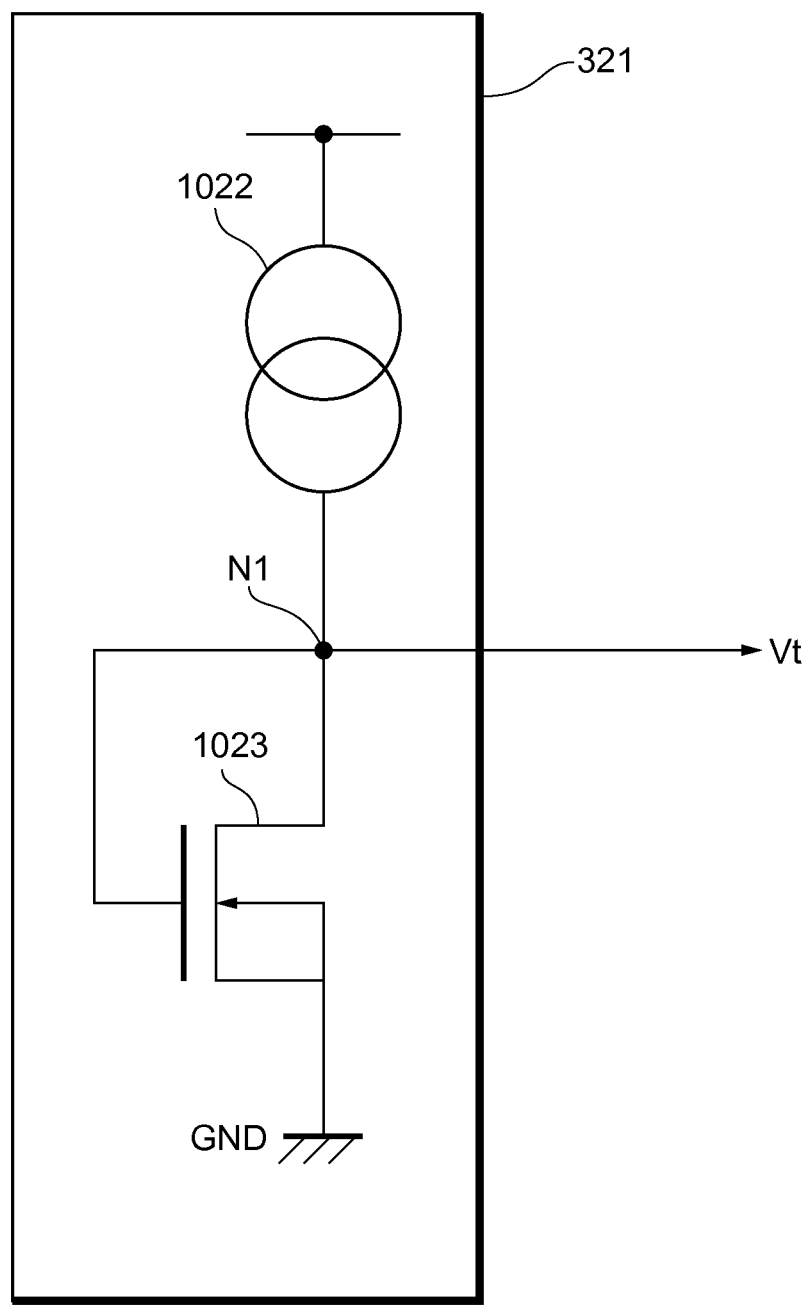
FIG. 10 is a circuit diagram illustrating a third example of the temperature sensor, according to an example embodiment.

FIG. 10 is a circuit diagram illustrating a third example of the temperature sensor 321. As illustrated in FIG. 10, the temperature sensor 321 includes a current source 1022 and a transistor 1023, for example. The transistor 1023 is an n-channel type MOSFET, for example, whose source is connected to the ground GND. The drain and the gate of the transistor 1023 are connected to the node N1, to which a constant current is supplied from the current source 1022. The voltage at the node N1 is output as the voltage Vt. Since the voltage between the gate and the source of the transistor 1023 has a temperature characteristic, the voltage Vt changes in proportion to temperature.

Figure 11:
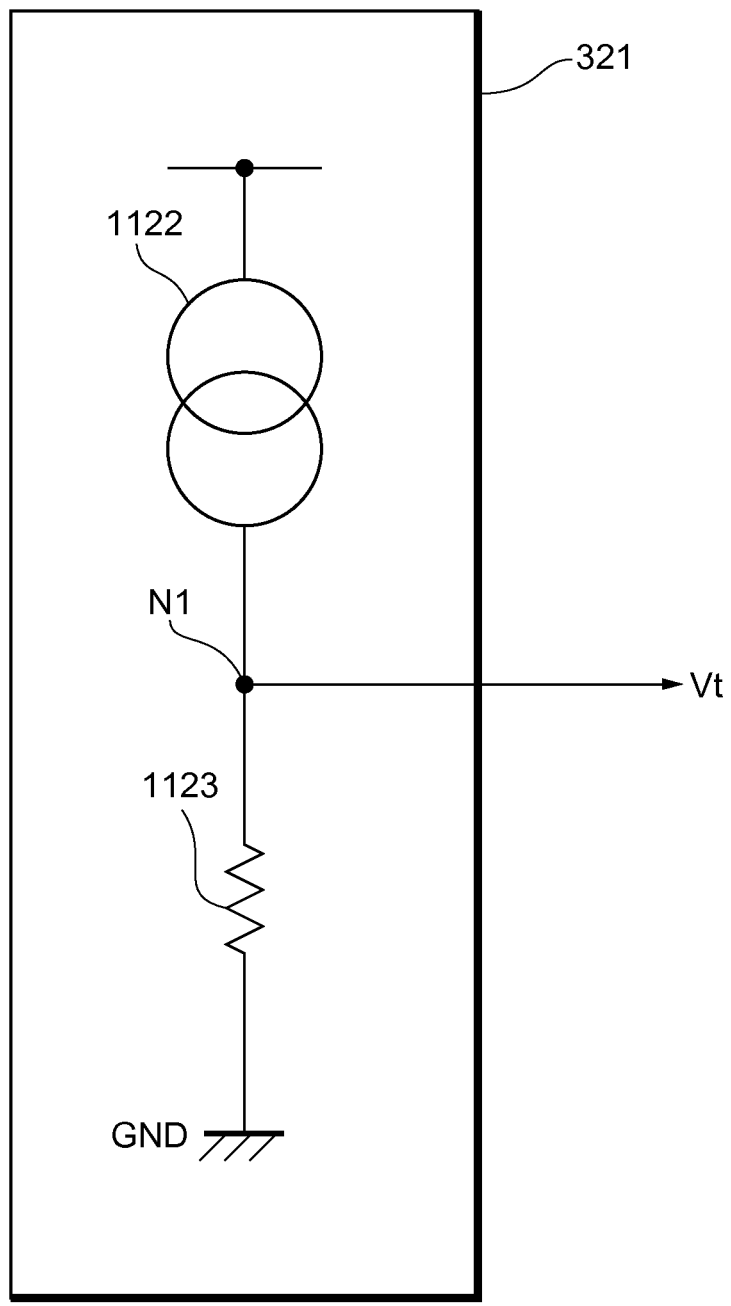
FIG. 11 is a circuit diagram illustrating a fourth example of the temperature sensor, according to an example embodiment.

FIG. 11 is a circuit diagram illustrating a fourth example of the temperature sensor 321. As illustrated in FIG. 11, the temperature sensor 321 includes a current source 1122 and a resistor 1123, for example. The resistor 1123 has one end connected to the ground GND and the other end connected to the node N1, to which constant current is supplied from the current source 1122. The voltage at the node N1 is output as the voltage Vt. Since the resistance of the resistor 1123 has a temperature characteristic, the voltage Vt changes in proportion to temperature. Conversely, the resistor 1123 may not have a temperature characteristic, and the current source 1122 may have a temperature characteristic like a PTAT (Proportional To Absolute Temperature) current source. In this case, the temperature sensor 321 may also generate voltage Vt that is in proportion to temperature.

Figure 12:
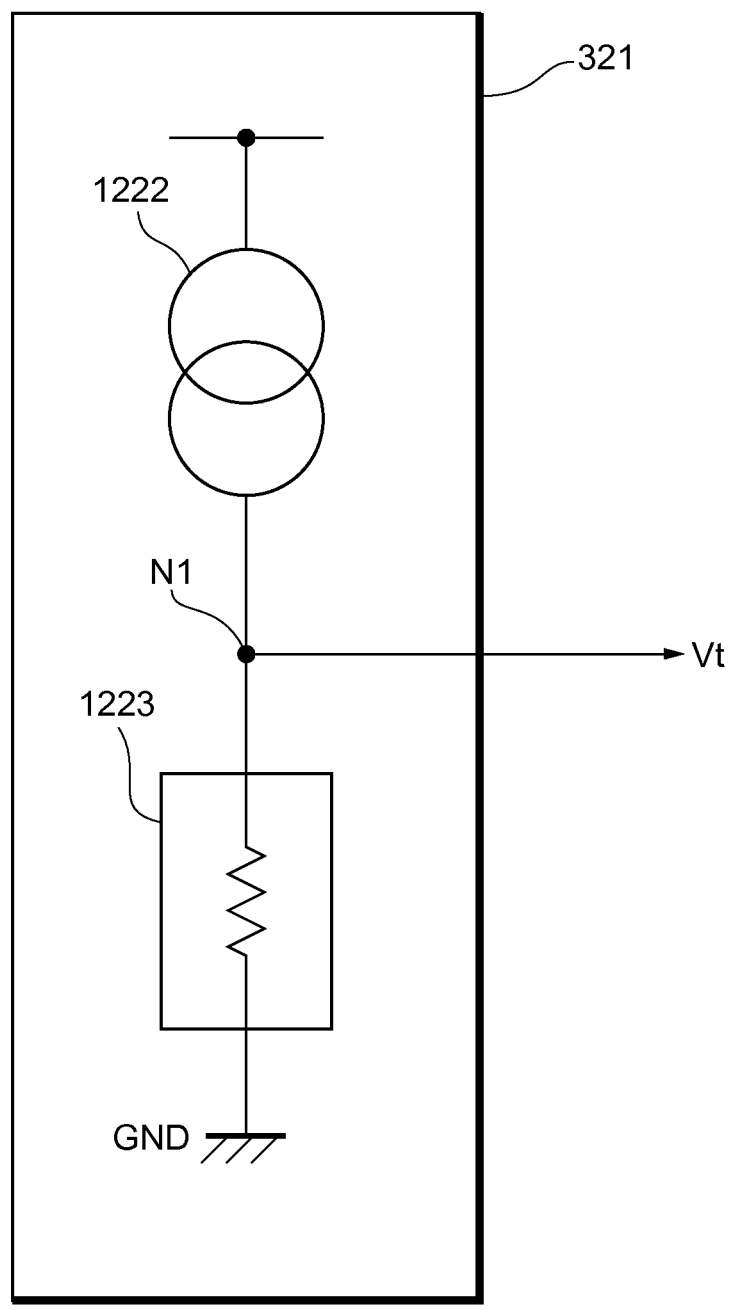
FIG. 12 is a circuit diagram illustrating a fifth example of the temperature sensor, according to an example embodiment.

FIG. 12 is a circuit diagram illustrating a fifth example of the temperature sensor 321. As illustrated in FIG. 12, the temperature sensor 321 includes a current source 1222 and a thermistor 1223, for example. The thermistor 1223 has one end connected to the ground GND and the other end connected to the node N1, to which a constant current is supplied from the current source 1222. The voltage at the node N1 is output as the voltage Vt. Since the resistance of the thermistor 1223 has a temperature characteristic, the voltage Vt changes in proportion to temperature.

Figure 13:
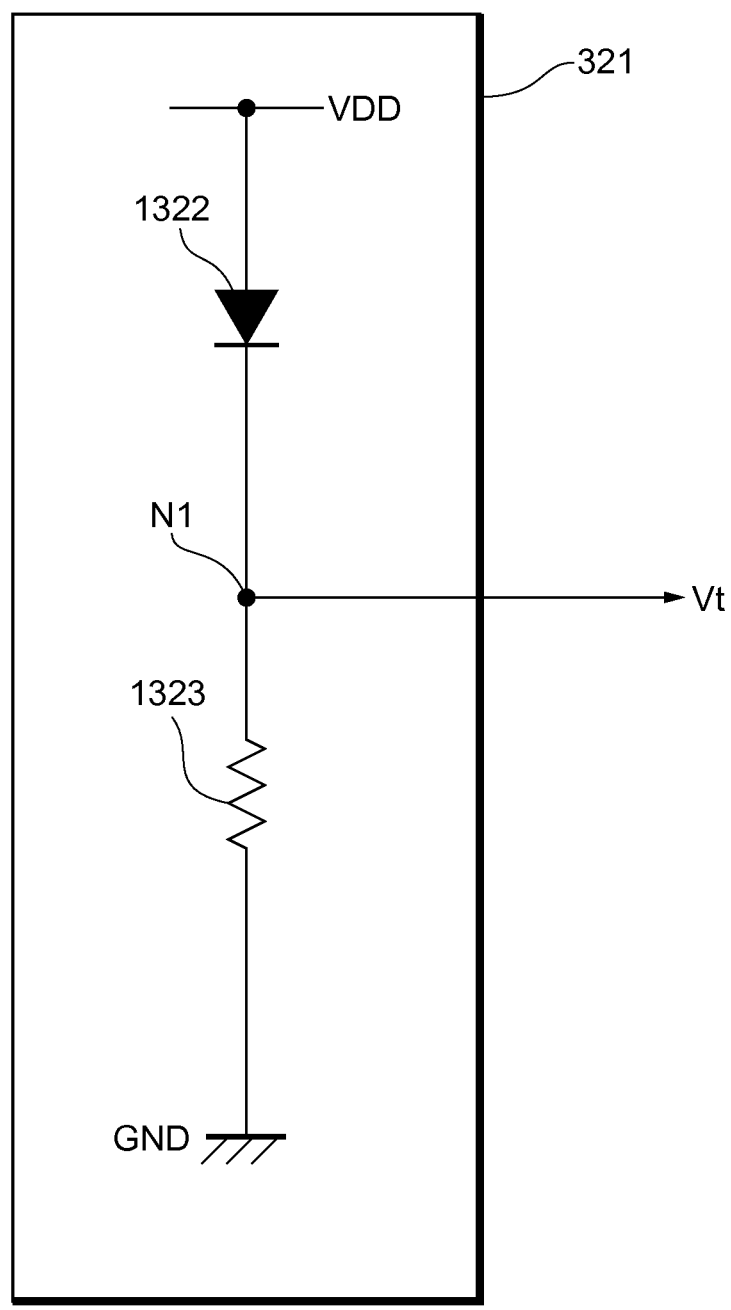
FIG. 13 is a circuit diagram illustrating a sixth example of the temperature sensor, according to an example embodiment.

FIG. 13 is a circuit diagram illustrating a sixth example of the temperature sensor 321. As illustrated in FIG. 13, the temperature sensor 321 includes a diode 1322 and a resistor 1323, for example. The resistor 1323 has one end connected to the ground GND and the other end connected to the node N1. The diode 1322 has an anode, to which power supply voltage VDD is supplied, and a cathode connected to the node N1. The voltage at the node N1 is output as the voltage Vt. The power supply voltage VDD does not depend on temperature. The diode 1322 being forward-biased, current flows through the diode 1322, and so voltage in the forward direction is generated. Since the voltage in the forward direction of the diode 1322 has a temperature characteristic, the voltage Vt changes in proportion to temperature.

Figure 14:
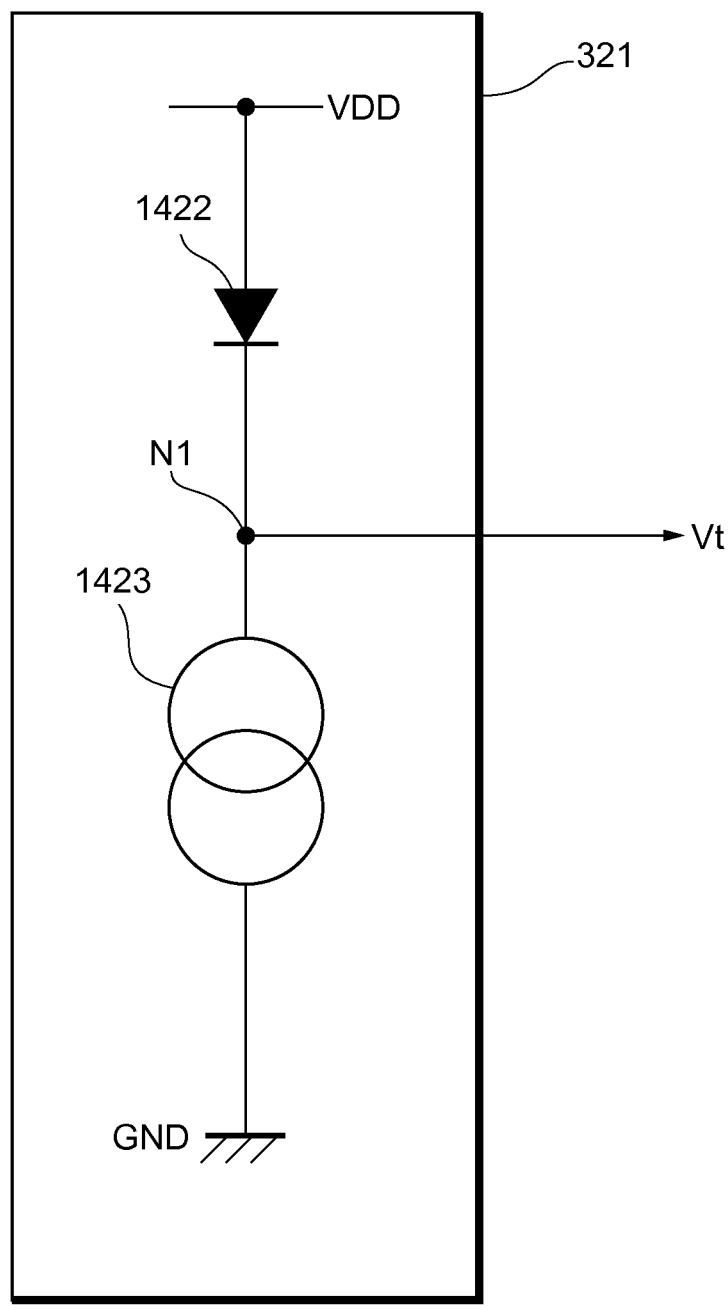
FIG. 14 is a circuit diagram illustrating a seventh example of the temperature sensor, according to an example embodiment.

FIG. 14 is a circuit diagram illustrating a seventh example of the temperature sensor 321. As illustrated in FIG. 14, the temperature sensor 321 includes a diode 1422 and a current source 1423, for example. The diode 1422 has an anode, to which power supply voltage VDD is supplied, and a cathode connected to the node N1, to which constant current is supplied from the current source 1423. The voltage at the node N1 is output as the voltage Vt. The power supply voltage VDD does not depend on temperature. Since the voltage in the forward direction of the diode 1422 has a temperature characteristic, the voltage Vt changes in proportion to temperature.

Figure 15:
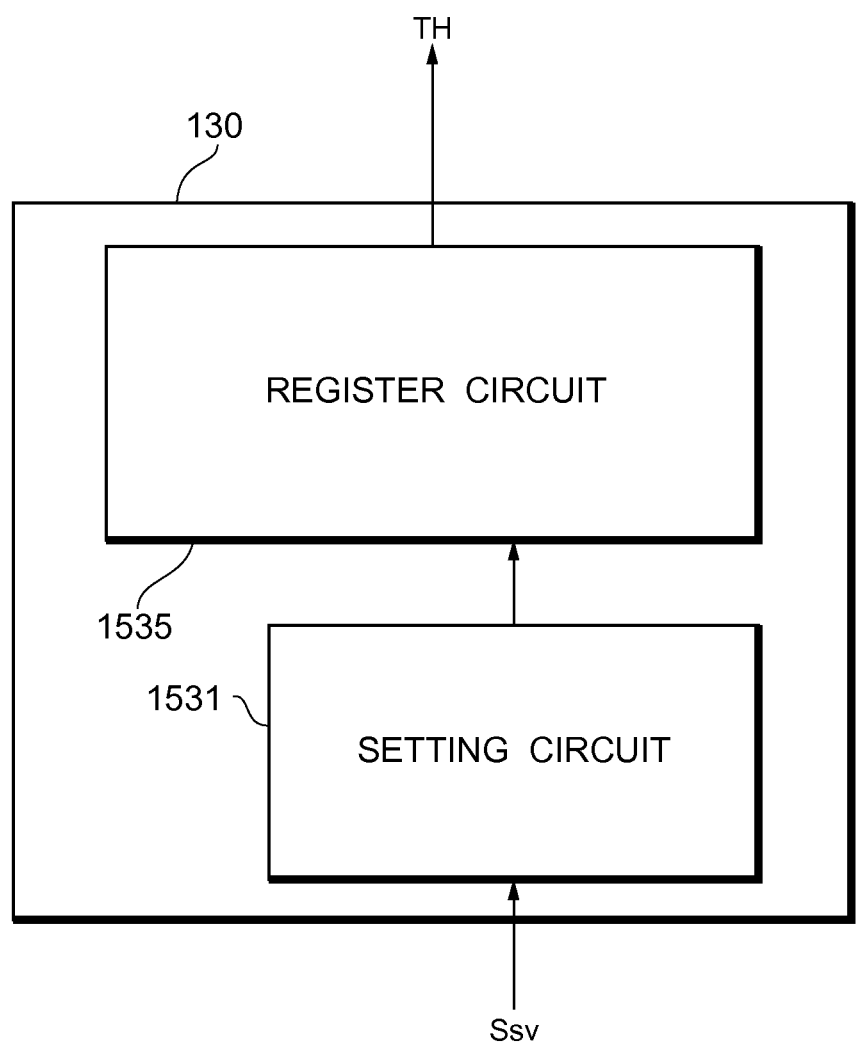
FIG. 15 is a block diagram illustrating a threshold setting part, according to an example embodiment.

FIG. 15 is a block diagram illustrating an example of the threshold setting part 130 in FIG. 1. The threshold setting part 130 is configured to set at least one threshold TH in accordance with the setting value signal Ssv. The setting value signal Ssv contains information about a second value TA2 against which the temperature of the object is to be compared. The threshold setting part 130 includes a setting circuit 1531 and a register circuit 1535, for example.

The setting circuit 1531 is configured to set the threshold TH in accordance with the second value TA2 and the number "n" of the temperature detectors 120 included in the temperature detection part 110 in FIG. 1. The setting circuit 1531 may include a microprocessor such as a CPU (Central Processing Unit), and a memory such as a ROM, a RAM or a buffer, for example. The register circuit 1535 may include at least one register. The setting circuit 1531 calculates the threshold TH, which is stored in the register circuit 1535. The threshold TH stored in the register circuit 1535 is output to the temperature determination part 150.

In the above example, the setting value signal Ssv is provided externally, and the threshold setting part 130 sets the threshold TH in FIGS. 1 and 15. However, this is not a limiting example. The threshold TH may be externally input to the temperature determination, part 150, for example. In such a case, the temperature detection circuit 100 does not have to include the threshold setting part 130.

Figure 16:
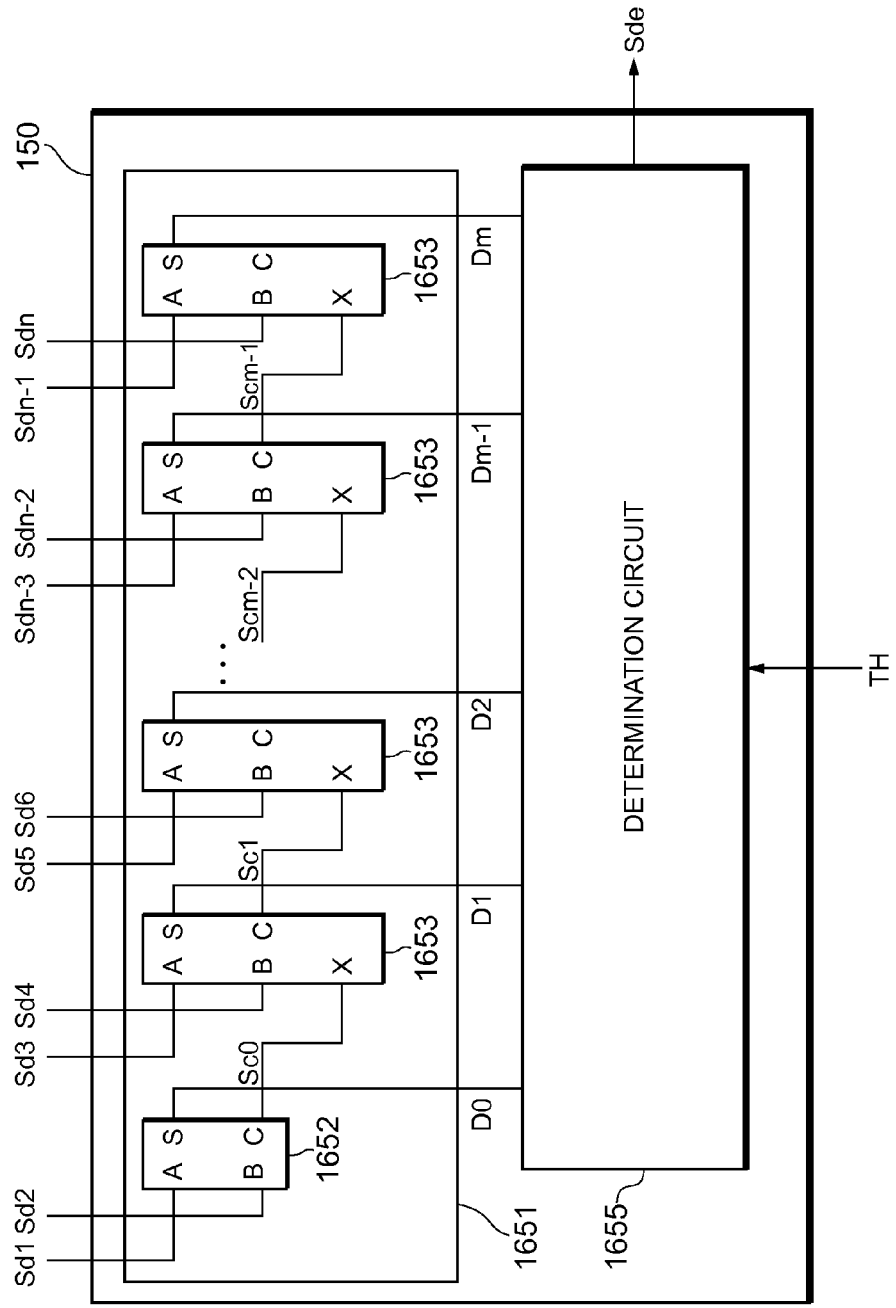
FIG. 16 is a block diagram illustrating a temperature determination part, according to an example embodiment.

FIG. 16 is a block diagram illustrating one example of the temperature determination part 150 in FIG. 1. The temperature determination part 150 includes a counter circuit 1651 and a determination circuit 1655, for example. Signals Sd1 through Sdn represent the detection signals that each of the n temperature detectors 120 of FIG. 1 outputs.

The counter circuit 1651 is configured to count the number of the detection signals Sd1 to Sdn that have an H level. The counter circuit 1651 includes a half-adder 1652 and m pieces (m is an integer of 1 or more) full adders 1653. When the number of the temperature detector 120 is n=2, the counter circuit 1651 may include the half-adder 1652 only, and does not have to include the full adder 1653. In this case, the half-adder 1652 outputs a carry signal Sc0 to the determination circuit 1655.

The half-adder 1652 has an input terminal A, to which the detection signal Sd1 of the first temperature detector 120 is input, and an input terminal B, to which the detection signal Sd2 of the second temperature detector 120 is input. The half-adder 1652 adds binary numbers. When the detection signals Sd1 and Sd2 are both "1", the half-adder 1652 outputs a data signal D0 of "0" from the output terminal. S and a carry signal Sc0 of "1" from the carry output terminal C. When the detection signals Sd1 and Sd2 are both "0", the half-adder 1652 outputs a data signal D0 of "0" and a carry signal Sc0 of "0". When one of the detection signals Sd1 and Sd2 is "1" and the other is "0", the half-adder 1652 outputs a data signal D0 of "1" and a carry signal Sc0 of "0".

In FIG. 16, the detection signal Sd3 of the third temperature detector 120 is input to the input terminal A of the full adder 1653 on the leftmost side, the detection signal Sd4 of the fourth temperature detector 120 is input to the input terminal B thereof, and the carry signal Sc0 of the half-adder 1652 is input to the carry input terminal X thereof. The full adder 1653 adds binary numbers. When the detection signals Sd3 and Sd4 and the carry signal Sc0 are all "1", the full-adder 1653 outputs a data signal D1 of "1" from the output terminal S and a carry signal Sc1 of "1" from the carry output terminal C. When the detection signals Sd3 and Sd4 and the carry signal Sc0 are all "0", the full-adder 1653 outputs a data signal D1 of "0" and a carry signal Sc1 of "0". When one of the detection signals Sd3 and Sd4 and the carry signal Sc0 is "1" and the others are "0", the full-adder 1653 outputs a data signal D1 of "1" and a carry signal Sc1 of "0". When one of the detection signals Sd3 and Sd4 and the carry signal Sc0 is "0" and the others are "1", the full-adder 1653 outputs a data signal D1 of "0" and a carry signal Sc1 of "1".

Since the second to the m-th full adders 1653 from the left have similar configurations and operate similarly, their illustrations and/or descriptions are omitted.

The counter circuit 1651 adds the detection signals Sd1 to Sdn at an H level, and outputs data D0 to Dm of m+1 bits. As a result of this, the number of the detection signals Sd1 to Sdn having H level is counted with m+1 binary digits.

The determination circuit 1655 receives the data D0 to Dm from the counter circuit 1651 and the threshold TH from the threshold setting part 130 in FIG. 15. The determination circuit 1655 is configured to determine whether the temperature of the object reaches the second value TA2 or not based on the threshold TH and the data D0 to Dm, the number of detection signals Sd1 to Sdn having an H level. The determination circuit 1655 is also configured to output a determination signal Sde when it is determined that the temperature of the object reaches the second value TA2. The determination circuit 1655 may include a micro-processor such as a CPU, and a memory such as a ROM, a RAM or a buffer, for example.

In the above example, the threshold TH is input to the temperature determination part 150 in FIG. 16. However, this is not a limiting example. Instead of the threshold TH, information on the second value TA2 may be input from the outside of temperature detection circuit 100, for example. The temperature determination part 150 may also be configured to store information on the second value TA2 beforehand in the memory of the determination circuit 1655 or the like.

In the above example, the temperature determination part 150 outputs a determination signal Sde to the outside of temperature detection circuit 100. However, this is not a limiting example. The temperature detection circuit 100 may further include a signal output part that is configured to output a determination signal Sde to the outside when the temperature determination part 150 determines that the temperature of the object has reached the second value TA2.

Figure 17:
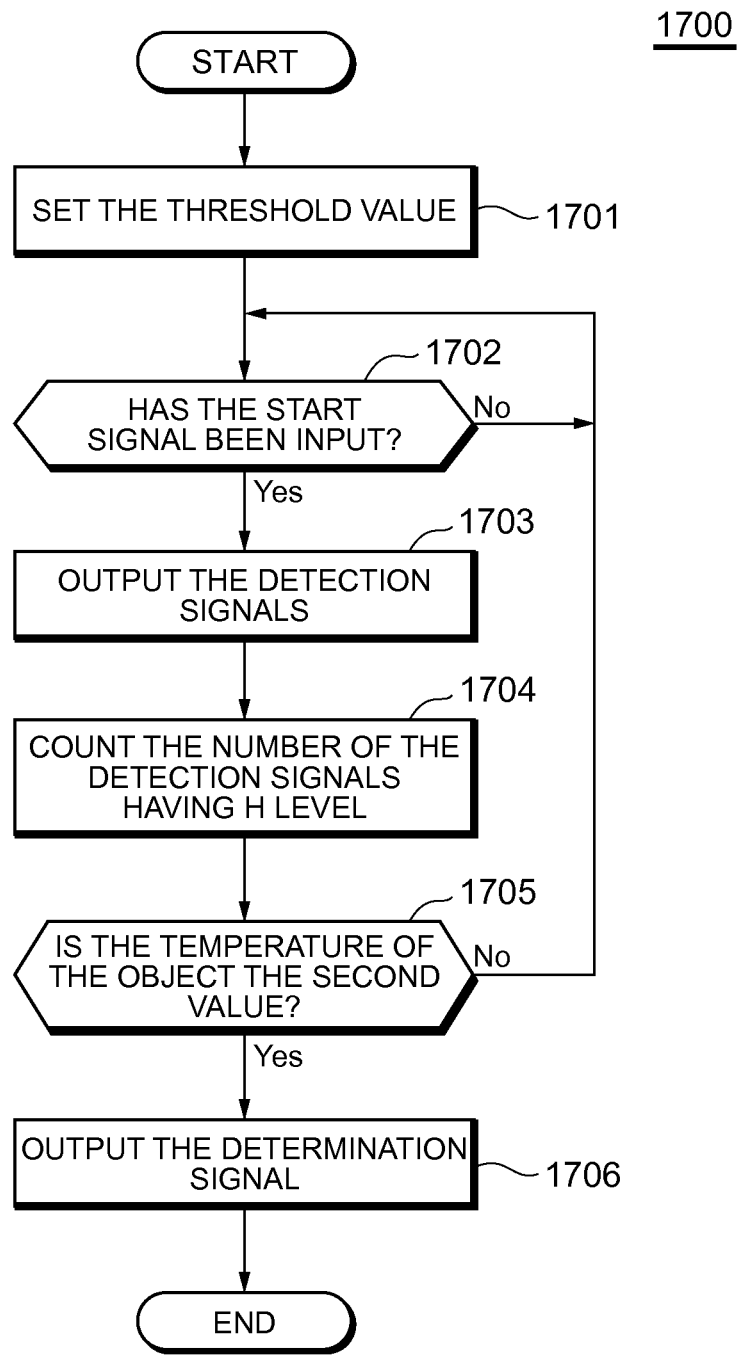
FIG. 17 is a flowchart describing an operation of the temperature detection circuit, according to an example embodiment.

FIG. 17 is a flowchart describing an example of the operation of the temperature detection circuit 100, according to an example embodiment. The temperature detection circuit 100 starts temperature detection process 1700 of FIG. 17 when a setting value signal Ssv is input.

Firstly the setting circuit 1531 of the threshold setting part 130 in FIG. 15 sets a threshold TH based on the second value TA2 included in the setting value signal Ssv and the number "n" of the temperature detectors 120 (step 1701), and outputs the threshold TH to the temperature determination part 150.

Next, the reference voltage circuit 212 in FIG. 2 and the comparator 325 in FIG. 3 determine whether a starting signal Sst is input or not (step 1702). The reference voltage circuit 212 and the comparator 325 repeat step 1702 until a starting signal Sst is input.

When the result of the determination at step 1702 shows that a starting signal Sst is input to the reference voltage circuit 212 and the comparator 325, each of the comparators 325 of the n temperature detectors 120 outputs a detection signal Sd1 to Sdn at an H level or at an L level (1703).

Next, the counter circuit 1651 in FIG. 16 adds the detection signals Sd1 to Sdn that are at an H level, counts the number of the detection signals Sd1 to Sdn that are at an H level (step 1704), and outputs data D0 to Dm to the determination circuit 1655.

Next, the determination circuit 1655 determines whether the temperature of the object has reached the second value TA2 or not based on the threshold TH and the number of detection signals Sd1 to Sdn that are at an H level (step 1705).

When the result of the determination at 1705 shows that the temperature of the object has reached the second value TA2, the determination circuit 1655 outputs a determination signal Sde (step 1706). Following the step of 1706, the temperature detection circuit 100 ends the temperature detection process 1700.

On the other hand, when the result of the determination at step 1705 shows that the temperature of the object has not reached the second value TA2, the procedure returns to the step 1702, where the temperature detection circuit 100 performs steps 1702 to 1706 again.

Referring to the flowchart of FIG. 17, the following describes a specific operation of the temperature detection circuit 100 in FIG. 1 by way of embodiments.

Embodiment 1

Embodiment 1 describes the case where the temperature detection circuit 100 includes 1000 temperature detectors 120 (n=1000), and the first value TA1 is set at 150° C. and the second value TA2 is set at 140° C.

When a starting signal Sst is input to the reference voltage generator 111 and the 1000 temperature detectors 120 in FIG. 1, at the step 1703 of FIG. 17, each of the comparators 325 of the 1000 temperature detectors 120 outputs a detection signal Sd1 to Sd1000 at an H level or at an L level in accordance with the temperature of the object. Then, at the step 1704, the counter circuit 1651 counts the number of the detection signals Sd1 to Sd1000 having an H level, and at the step 1705, the determination circuit 1655 determines whether the temperature of the object has reached 140° C. or not based on the threshold TH and the number of the detection signals Sd1 to Sd1000 having an H level.

Since the first value TA1 is set at 150° C., all of the detection signals Sd1 to Sd1000 output from the temperature detectors 120 are ideally at an L level when the temperature of the object is less than 150° C., and should be at an H level when the temperature of the object is 150° C. or more.

However, the reference voltage Vr generated by the reference voltage generator 111 and the voltage Vt output from the temperature sensor 321 vary, and the comparator 325 has an error factor such as input offset voltage. Consequently, all of the detection signals Sd1 to Sd1000 do not change from an L level to an H level when the temperature of the object reaches 150° C. Instead, each of the detection signals Sd1 to Sd1000 changes from an L level to an H level in a distributed manner when the temperature of the object is within a predetermined range centered at 150° C.

That is, the detection signals Sd1 to Sd1000 having an H level are distributed in accordance with the normal distribution having the temperature of the object as a random variable and having the average as the first value TA1, i.e., 150° C. Then the standard deviation (a) of this normal distribution may be found, whereby the temperature of the object within the normal distribution can be predicted with a high probability based on the number of the detection signals Sd1 to Sd1000 having an H level.

Figure 18:
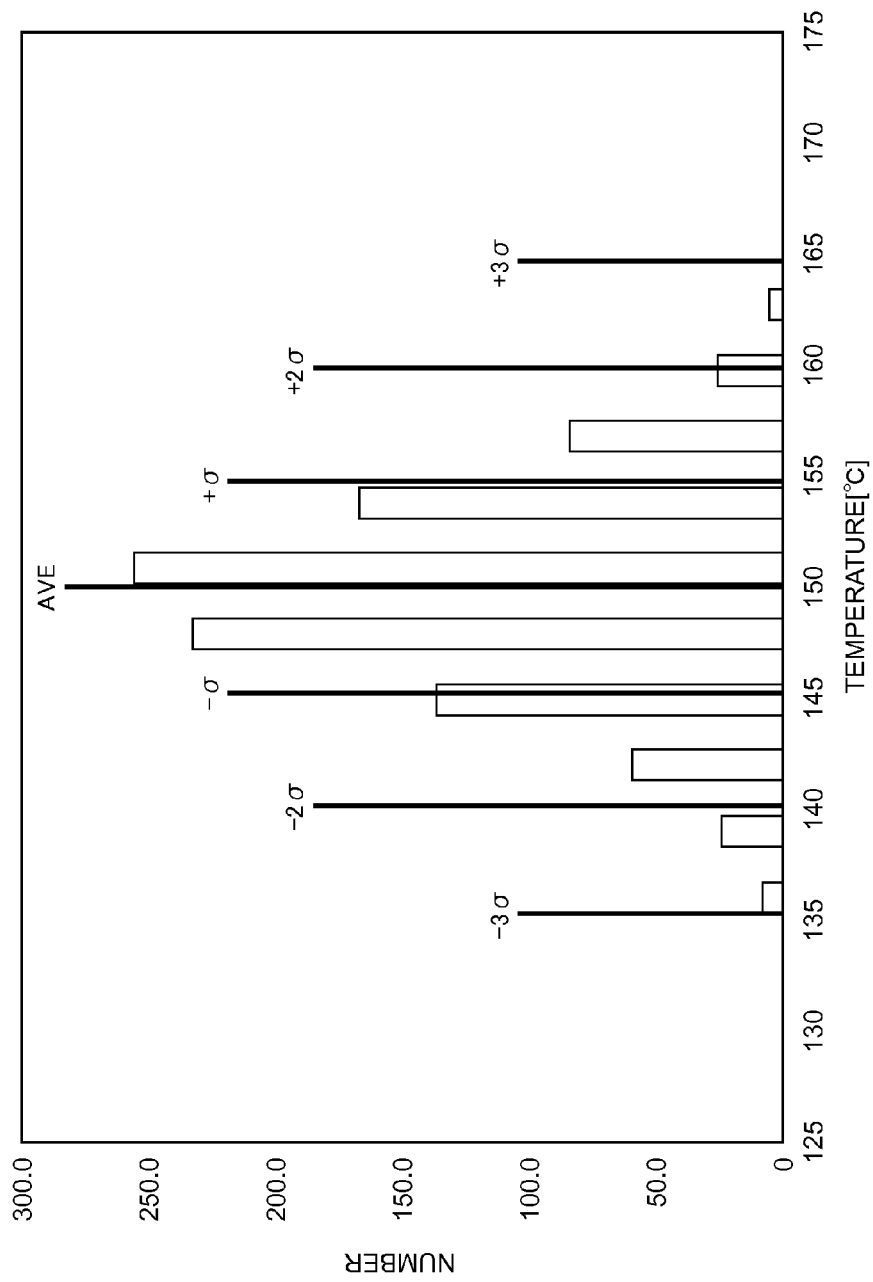
FIG. 18 is a graph showing simulation results of temperature detectors, according to an example embodiment.

FIG. 18 is a graph showing the simulation results of the 1000 temperature detectors 120, while setting the first value TA1 at 150° C. In FIG. 18, the horizontal axis represents the temperature of the object and the vertical axis represents the number of temperature detectors 120 whose detection signals Sd1 to Sd1000 change from an L level to an H level. When the standard deviation (a) of temperature where the detection signals Sd1 to Sd1000 change from an L level to an H level is 5° C., for example, as can be seen in FIG. 18, the simulation results in a normal distribution where the temperature of the object has an average at 150° C. FIG. 18 shows that most of the detection signals Sd1 to Sd1000 of the 1000 temperature detectors 120 changing from an L level to an H level are distributed in the range of plus or minus three times the standard deviation (±3σ) around the 150° C. average.

Figure 19:
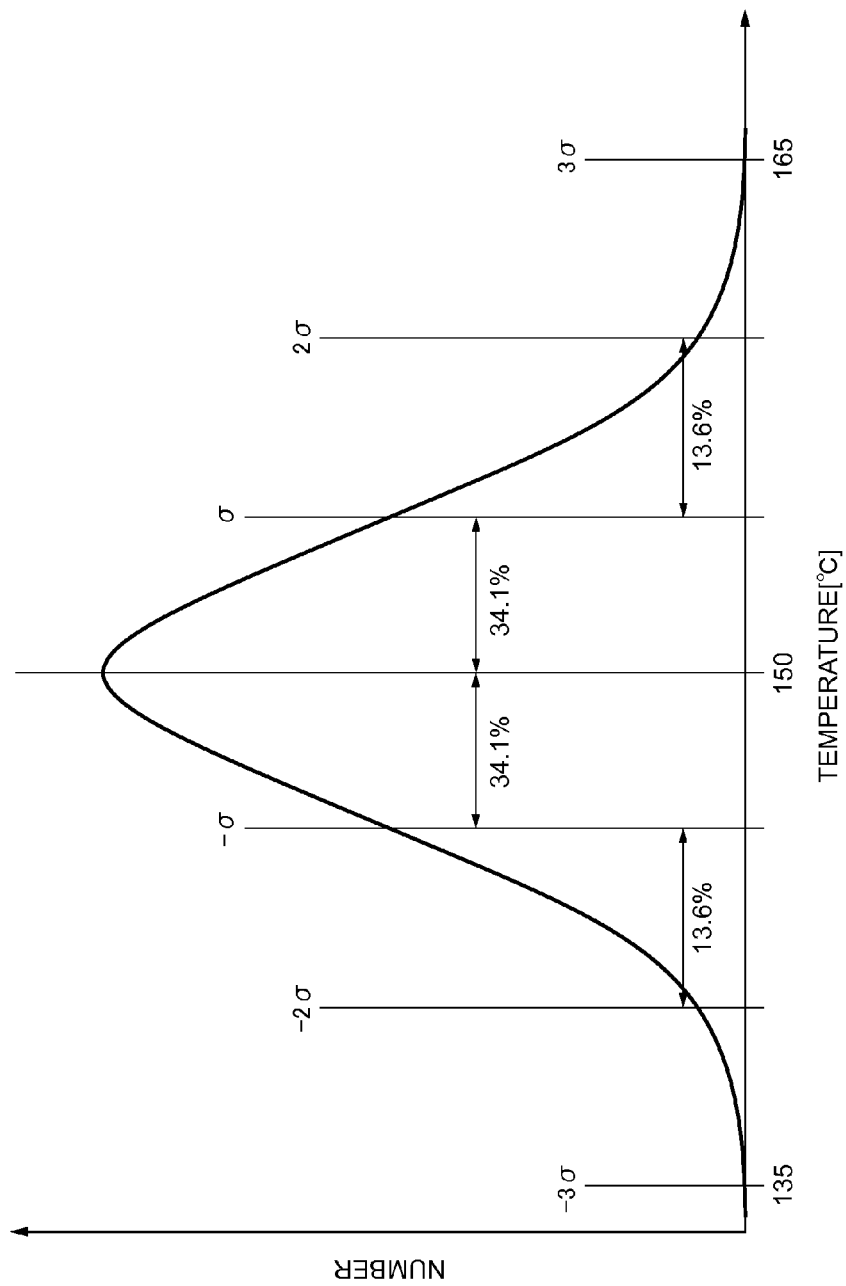
FIG. 19 is a graph describing a distribution of the temperature detectors, according to an example embodiment.

FIG. 19 is a graph describing an example of the normal distribution of the temperature detectors 120 having the first value TA1 set at 150° C., and FIG. 20 is a table showing an example of the relationship between the total number of detection signals Sd1 to Sd1000 having an H level and the temperature of the object in the normal distribution in FIG. 19. In FIG. 19, the horizontal axis represents the temperature of the object and the vertical axis represents the number of temperature detectors 120 whose detection signals Sd1 to Sd1000 change from an L level to an H level. As illustrated in FIG. 19, the temperatures of the detection signals Sd1 to Sd1000 of the temperature detectors 120 changing from an L level to an H level are distributed in the normal distribution having an average temperature of 150° C. This normal distribution has a standard deviation (a) of 5° C., for example. That is, 99.73% of the 1000 temperature detectors 120 are in the range of plus or minus three times the standard deviation (±3σ) around the 150° C. average, i.e., the range from 135° C. to 165° C. As shown in FIG. 20, when the temperature of the object reaches 150° C., the average of the normal distribution in FIG. 19, the total number of the detection signals Sd1 to Sd1000 having an H level is 500. Then, when the temperature of the object reaches 140° C., the second value TA2, the total number of the detection signals Sd1 to Sd1000 having an H level is 23.

Then, referring to step 1701 in FIG. 17, the setting circuit 1531 of the threshold setting part 130 sets the threshold TH at 23 based on the normal distribution in FIGS. 19 and 20. At step 1705, the determination circuit 1655 determines whether the temperature of the object is 140° C. or not based on this threshold TH and the number of the detection signals Sd1 to Sd1000 having an H level. The determination circuit 1655 determines that the temperature of the object is 140° C. when the number of the detection signals Sd1 to Sd1000 having an H level, counted by the counter circuit 1651, equals 23. The determination circuit 1655 determines that the temperature of the object is not 140[° C.] when the counted number of detection signals Sd1 to Sd1000 have an H level does not equal 23.

Alternatively, the determination circuit 1655 may determine that the temperature of the object is 140° C. when the number of the detection signals Sd1 to Sd1000 having an H level, counted by the counter circuit 1651, is more than 23, for example, and determine that the temperature of the object is not 140° C. when it is smaller than 23.

The determination circuit 1655 may store beforehand, in the memory, for example, the relationship between the number of the detection signals Sd1 to Sd1000 having an H level and the temperature of the object illustrated in FIG. 20. In this case, the determination circuit 1655 is configured, for example, to determine whether the temperature of the object has reached the second value TA2 of 140° C. or not based on the number of the detection signals Sd1 to Sd1000 having an H level that is counted by the counter circuit 1651. Such a determination as to whether the temperature of the object is 140° C. or not, based on the number of the detection signals Sd1 to Sd1000 having an H level, enables precise determination of the temperature of the object at the second value TA2 in the range of the normal distribution of the 1000 temperature detectors 120.

For instance, assume that the counter circuit 1651 has an error of plus or minus 1. Then, the normal distribution in FIG. 19 shows that the temperature of the object is 139.9° C. when the number of the detection signals Sd1 to Sd1000 having an H level is 22, or 140.15° C. when the number of the detection signals is 24. This means that the temperature detection circuit 100 can detect that the temperature of the object is 140±0.15° C. Therefore, the degree of precision can be improved greatly using the 1000 temperature detectors 120 having a standard deviation of 5° C.

Embodiment 2

Embodiment 2 describes the case where, similar to Embodiment 1, the temperature detection circuit 100 includes 1000 temperature detectors 120 (n=1000). The first value TA1 is set at 150° C., and the second value TA2 is set at 140° C. But in Embodiment 2, an error is further set at ±2.5° C.

That is, the threshold setting part 130 in FIG. 15 is configured to set a lower limit LL and an upper limit UL as the threshold TH. As illustrated in FIG. 20, when the temperature of the object is 137.5° C., the total number of the detection signals Sd1 to Sd1000 having an H level is 6. When the temperature of the object is 142.5° C., the total number is 67. Then, referring to step 1701 of FIG. 17, the setting circuit 1531 of the threshold setting part 130 sets the lower limit LL to 6 and the upper limit UL to 67. At step 1705, the determination circuit 1655 determines that the temperature of the object has reached 140° C.] when the number of the detection signals Sd1 to Sd1000 having an H level is between 6 and 67. Therefore, the temperature of the object at the second value TA2, in the range of the normal distribution of the 1000 detection signals Sd1 to Sd1000, may be determined with any degree of precision.

Embodiment 1 and Embodiment 2 use Celsius as the unit for temperature of the object. However, this is not a limiting example. The temperature of the object may be in the other units such as Fahrenheit, Kelvin and Rankine.

Embodiment 1 and Embodiment 2 describe the case where the second value TA2 is smaller than the first value TA1. However, this is not a limiting example. The second value TA2 may be larger than or equal to the first value TA1.

The temperature detection circuit 100 of the present embodiment includes the n pieces (n is an integer of 2 or more) of temperature detectors 120 that are configured to output a temperature detection signal Sd at an H level when the temperature of the object reaches the first value TA1, and the temperature determination part 150 that is configured to determine whether the temperature of the object reaches the second value TA2 or not based on the number of detection signals Sd1 to Sdn having an H level. This allows the determination to be performed precisely about the temperature of the object at the second value TA2 in the range of the normal distribution of the n temperature detectors 120, Variations of the plurality of temperature detectors 120 are used for statistical analysis. As such, the degree of precision of the temperature of the object at the second value TA2, determined by the temperature determination part 150, can be improved even when each of the temperature detectors 120 have a low degree of precision. The detection of the temperature of the object reaching the second value TA2 can thus be performed precisely.

Temperature Measurement Circuit

Figure 21:
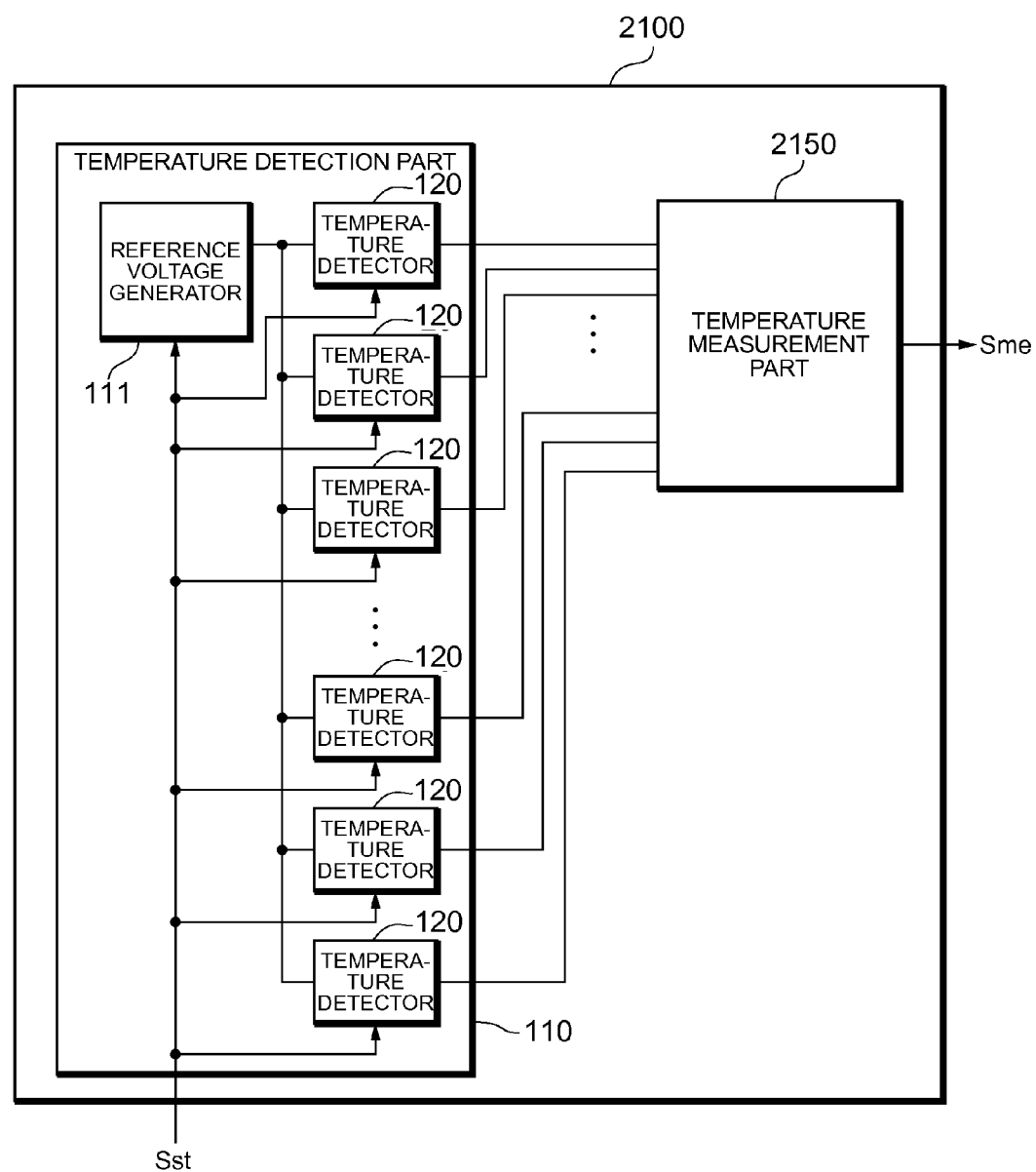
FIG. 21 is a block diagram illustrating a temperature measurement circuit, according to an example embodiment.
Figure 22:
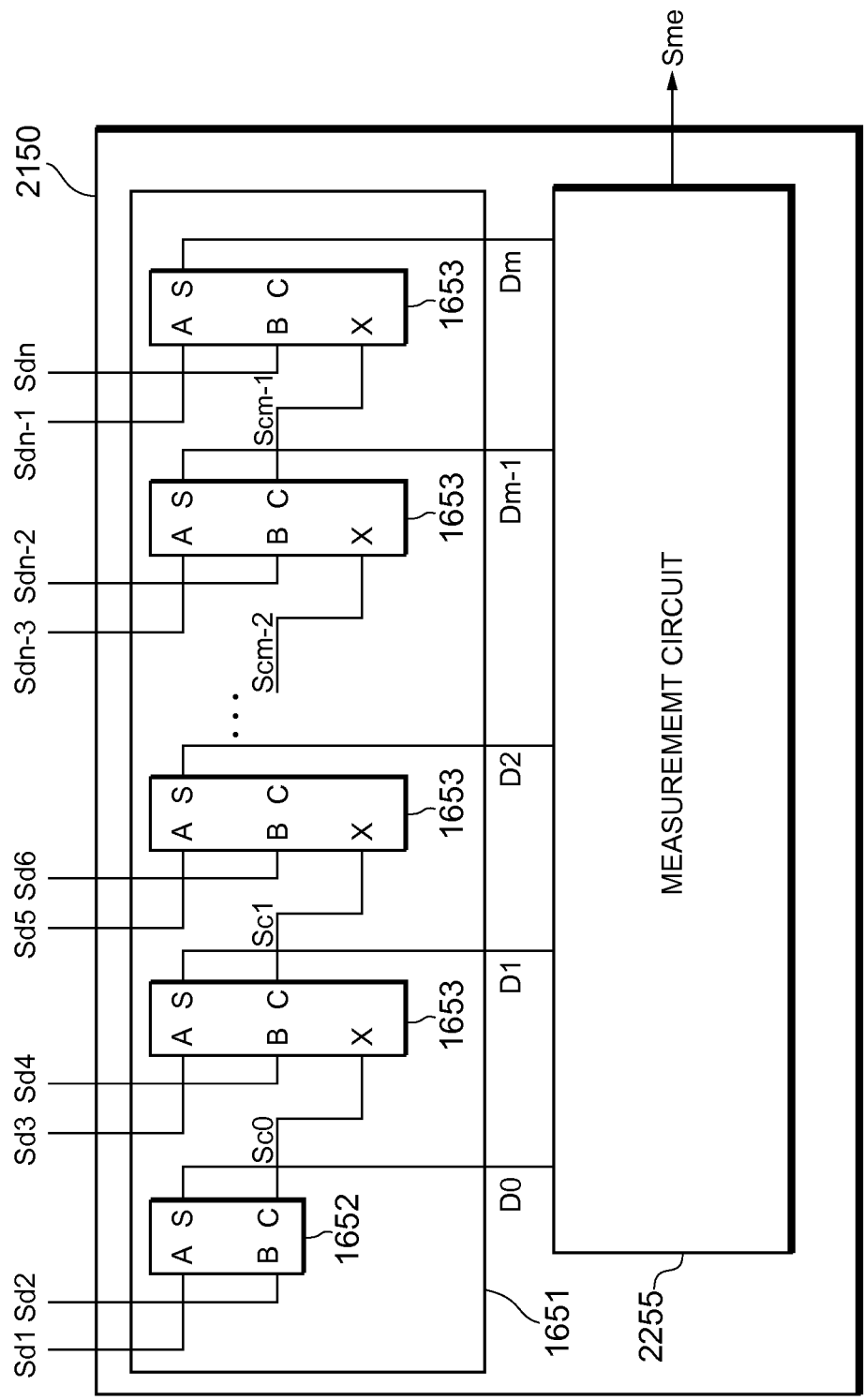
FIG. 22 is a block diagram illustrating a temperature measurement part, according to an example embodiment.
Figure 23:
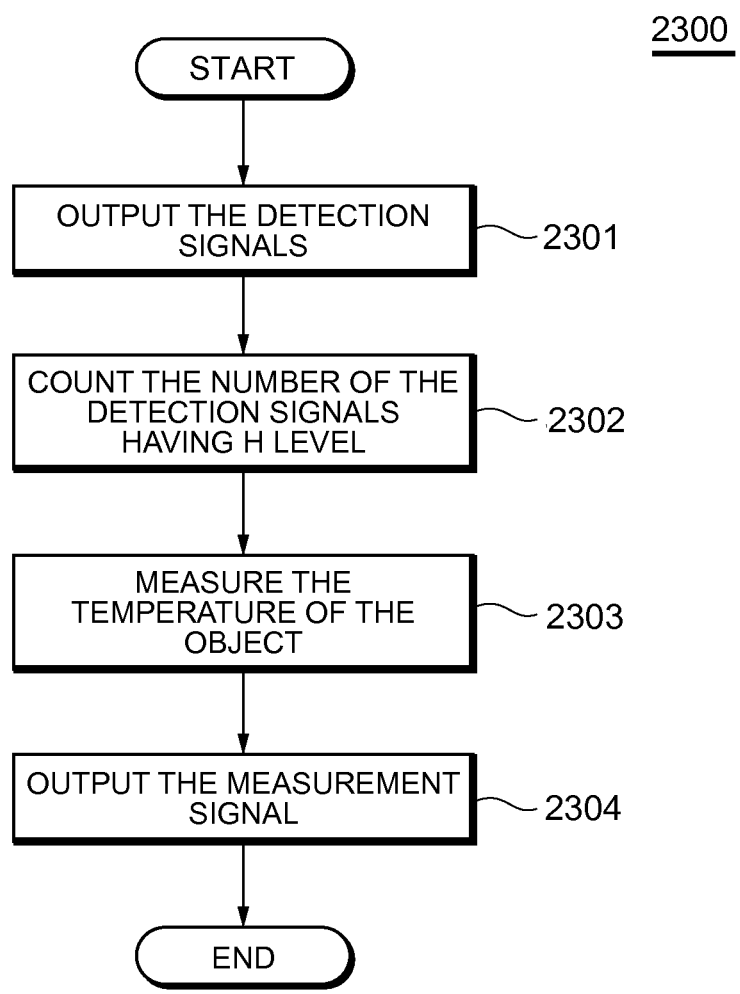
FIG. 23 is a flowchart describing an operation of the temperature measurement circuit, according to an example embodiment.

FIGS. 21 to 23 describe an example embodiment of the temperature measurement circuit. Like reference numbers designate like parts in the embodiments of the temperature detection circuit 100 as stated above unless otherwise stated, and their descriptions are omitted as needed. The parts and operations not illustrated are similar to those in the embodiments of the temperature detection circuit 100 as stated above.

FIG. 21 is a block diagram illustrating a temperature measurement circuit 2100, according to an example embodiment. The temperature measurement circuit 2100 is configured to measure the temperature of an object. Similar to the temperature detection circuit 100 in FIG. 1, the object, for example, may be a semiconductor device or the air where the semiconductor device is located. As illustrated in FIG. 21, the temperature measurement circuit 2100 includes a temperature detection part 110 and a temperature measurement part 2150.

The temperature measurement part 2150 outputs a measurement signal Sme to an external electronic circuit or electronic device, for example. The measurement signal Sme is to report the temperature of the object.

FIG. 22 is a block diagram illustrating one example of the temperature measurement part 2150 in FIG. 21. The temperature measurement part 2150 includes a counter circuit 1651 and a measurement circuit 2255, for example. Since the counter circuit 1651 is similar to the counter circuit 1651 in FIG. 16, its description is omitted.

The measurement circuit 2255 receives data D0 to Dm from the counter circuit 1651 as an input. The measurement circuit 2255 is configured to measure the temperature of the object based on the data D0 to Dm, i.e., the number of detection signals Sd1 to Sdn having an H level. The measurement circuit 2255 is then configured to output a measurement signal Sme containing information on the temperature of the object. The measurement circuit 2255 may include a micro-processor such as a CPU, and a memory such as a ROM, a RAM or a buffer, for example.

In the above example, the temperature measurement part 2150 outputs a measurement signal Sme to the outside of temperature measurement circuit 2100. However, this is not a limiting example. The temperature measurement circuit 2100 may further include a signal output part that is configured to output a measurement signal Sme to the outside when the temperature measurement part 2150 measures the temperature of the object, for example.

FIG. 23 is a flowchart describing an example of the operation of the temperature measurement circuit 2100, according to an example embodiment. The temperature measurement circuit 2100 starts temperature measurement process 2000 of FIG. 23 when a starting signal Sst is input.

Firstly each of the comparators 325 of the n temperature detectors 120 outputs a detection signal Sd1 to Sdn at an H level or at an L level (step 2001).

Next, the counter circuit 1651 in FIG. 22 adds the detection signals Sd1 to Sdn that are at an H level, counts the number of the detection signals Sd1 to Sdn that are at an H level (step 2002), and outputs data D0 to Dm to the measurement circuit 2255.

Next, the measurement circuit 2255 measures the temperature of the object based on the number of detection signals Sd1 to Sdn that are at an H level (step 2003).

Next, the measurement circuit 2255 outputs the measurement signal Sme to the outside based on a result of the measurement (2004). Following the step of 2004, the temperature measurement circuit 2100 ends the temperature measurement processing 2000.

Referring to the flowchart of FIG. 23, the following describes a specific operation of the temperature measurement circuit 2100 in FIG. 21 by way of an embodiment.

Embodiment 3

Embodiment 3 describes the case where the temperature measurement circuit 2100 includes 1000 temperature detectors 120 (n=1000), and the first value TA1 is set at 150° C.

When a starting signal Sst is input to the reference voltage generator 111 and the 1000 temperature detectors 120 in FIG. 21, at the step 2001 of FIG. 23, each of the comparators 325 of the 1000 temperature detectors 120 outputs a detection signal Sd1 to Sd1000 at an H level or at an L level in accordance with the temperature of the object. Then, at the step 2002, the counter circuit 1651 counts the number of the detection signals Sd1 to Sd1000 having an H level, and at the step 2003, the measurement circuit 2255 measures the temperature of the object based on the number of the detection signals Sd1 to Sd1000 having an H level.

As illustrated in FIG. 19, the temperatures of the detection signals Sd1 to Sd1000 of the temperature detectors 120 changing from an L level to an H level are distributed in the normal distribution having an average at 150° C. This normal distribution has a standard deviation (a) of 5° C., for example. As illustrated in FIG. 20, when the total number of the detection signals Sd1 to Sd1000 having an H level is 977, the temperature of the object is 160[° C.].

The measurement circuit 2255 may store beforehand, in the memory, for example, the relationship between the number of the detection signals Sd1 to Sd1000 having an H level and the temperature of the object illustrated in Ha 20. The measurement circuit 2255 measures the temperature of the object based on the number of the detection signals Sd1 to Sd1000 having an H level that is counted by the counter circuit 1651, for example. The temperature of the object can thus be measured precisely at a predetermined value in the range of the normal distribution of the 1000 temperature detectors 120.

Embodiment 3 uses Celsius as the unit for temperature of the object. However, this is not a limiting example. The temperature of the object may be in the other units such as Fahrenheit, Kelvin and Rankine.

Embodiment 3 describes the example where the temperature of the object measured by the temperature measurement part 2150 is larger than the first value TA1. However, this is not a limiting example. The temperature of the object measured by the temperature measurement part 2150 may be smaller than or equal to the first value TA1.

The temperature measurement circuit 2100 of the present embodiment includes the n pieces (n is an integer of 2 or more) of temperature detectors 120 that are configured to output a temperature detection signal Sd at an H level when the temperature of the object reaches the first value TA1, and the temperature measurement part 2150 that is configured to measure the temperature of the object based on the number of detection signals Sd1 to Sdn having an H level. This allows precise measurement of the temperature of the object in the range of the normal distribution of the n temperature detectors 120. Variations of the plurality of temperature detectors 120 are used for statistical analysis. As such, the degree of precision of the temperature of the object measured by the temperature measurement part 2150 can be improved even when each of the temperature detectors 120 have a low degree of precision. The temperature of the object can thus be measured precisely.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are rot necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A temperature detection circuit, comprising:
 a plurality of temperature detectors configured to each detect when a temperature of an object reaches a same first value and each output a detection signal having a particular level when the temperature of the object reaches the first value; and
 a temperature determination part comprising a counter circuit configured to count a number of temperature detectors outputting the detection signal having the particular level and a determination circuit configured to output a determination signal when the temperature of the object reaches a second value determined based on the number of temperature detectors outputting the detection signal having the particular level.

2. The temperature detection circuit of claim 1, further comprising:
 a threshold setting part configured to set one or more threshold values based on the second value and a total number of temperature detectors included in the plurality of temperature detectors,
 wherein the temperature determination part is configured to determine if the temperature of the object has reached the second value based on a comparison between the one or more threshold values and the count of the detection signals having a particular level.

3. The temperature detection circuit of claim 2, wherein the threshold setting part is configured to set a lower limit and an upper limit as the threshold values,
 wherein the temperature determination part is configured to determine if the temperature of the object has reached the second value when the count of the detection signals having a particular level is between the lower limit and the upper limit.

4. The temperature detection circuit of claim 1, further comprising:
 a counter configured to count a number of the detection signals having a particular level.

5. The temperature detection circuit of claim 1, further comprising:
 a signal output part configured to output the determination signal when the temperature of the object is determined to have reached the second value.

6. The temperature detection circuit of claim 1, wherein each of the plurality of temperature detectors comprises a comparator configured to output the detection signal by comparing a temperature signal based on the temperature of the object and a reference signal based on the first value.

7. The temperature detection circuit of claim 6, wherein each of the plurality of temperature detectors further comprises a temperature sensor configured to output the temperature signal.

8. The temperature detection circuit of claim 6, wherein at least two of the plurality of temperature detectors share a temperature sensor configured to output the temperature signal.

9. The temperature detection circuit of claim 1, wherein the second value equals the first value.

10. A temperature measurement circuit, comprising:
 a plurality of temperature detectors configured to each detect when a temperature of an object reaches a same particular value and each output a detection signal having a particular level when the temperature of the object reaches the particular value; and
 a temperature measurement part comprising a counter circuit configured to count a number of temperature detectors outputting the detection signal having the particular level and a measurement circuit configured to measure the temperature of the object based on the number of temperature detectors outputting the detection signal having the particular level.

* * * * *